US012541024B1

(12) United States Patent
Vargo et al.

(10) Patent No.: US 12,541,024 B1
(45) Date of Patent: Feb. 3, 2026

(54) REMOTE DETECTION OF TOP OF CEMENT USING ENERGY PULSES

(71) Applicant: Halliburton Energy Services, Inc., Houston, TX (US)

(72) Inventors: Richard Frank Vargo, Houston, TX (US); Anoop Sheshrao Jogdand, Pune (IN); K V V N Krishna Babu Yerubandi, Houston, TX (US); Nachiket Hemant Gokhale, Pune (IN); Venkata Gopala Rao Palla, Houston, TX (US); Walmy Cuello Jimenez, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 19/038,489

(22) Filed: Jan. 27, 2025

(51) Int. Cl.
  *G01S 15/08* (2006.01)
  *E21B 47/07* (2012.01)
  *E21B 47/095* (2012.01)

(52) U.S. Cl.
  CPC .............. *G01S 15/08* (2013.01); *E21B 47/07* (2020.05); *E21B 47/095* (2020.05)

(58) Field of Classification Search
  CPC ......... G01S 15/08; E21B 47/07; E21B 47/095
  See application file for complete search history.

(56) References Cited

U.S. PATENT DOCUMENTS

| | | | | |
|---|---|---|---|---|
| 2,961,602 A | * | 11/1960 | Bender | E21B 47/092 331/65 |
| 4,802,145 A | * | 1/1989 | Mount, II | E21B 47/005 367/27 |
| 5,377,160 A | * | 12/1994 | Tello | G01V 1/52 166/253.1 |
| 5,377,753 A | * | 1/1995 | Haberman | E21B 28/00 166/177.6 |
| 5,874,676 A | * | 2/1999 | Maki, Jr. | E21B 47/005 73/152.58 |

(Continued)

FOREIGN PATENT DOCUMENTS

WO    2020162964 A1    8/2020

OTHER PUBLICATIONS

International Search Report and Written Opinion for International Patent Application No. PCT/US2025/016884 dated Oct. 16, 2025. PDF file. 10 pages.

*Primary Examiner* — Steven A Macdonald
(74) *Attorney, Agent, or Firm* — Thomas Rooney; C. Tumey Law Group PLLC

(57) ABSTRACT

A variety of methods and systems for detecting top of cement in well operations are disclosed, including, in one embodiment, a method for detecting top of cement, including: emitting input energy signals into a cement displacement fluid positioned in a casing, wherein the input energy signals travel in the cement displacement fluid down the casing and are reflected in the casing to form reflected energy signals that return to a surface, and wherein the input energy signals are emitted while a cement composition is setting to harden and form compressive strength in a borehole annulus; measuring one or more properties of the reflected energy signals; and determining the top of cement of the cement composition in the borehole annulus based on at least the one or more properties and temperature data of the borehole.

20 Claims, 19 Drawing Sheets

(56) References Cited

U.S. PATENT DOCUMENTS

| | | | | |
|---|---|---|---|---|
| 6,050,141 | A * | 4/2000 | Tello | E21B 49/005 73/152.56 |
| 6,053,245 | A * | 4/2000 | Haberman | E21B 33/14 166/250.14 |
| 6,401,814 | B1 * | 6/2002 | Owens | E21B 33/16 166/250.14 |
| 6,802,373 | B2 * | 10/2004 | Dillenbeck | E21B 33/05 166/250.14 |
| 8,327,934 | B2 * | 12/2012 | Jennings | E21B 33/068 166/64 |
| 8,726,993 | B2 * | 5/2014 | Cooke, Jr. | E21B 23/02 166/177.6 |
| 9,038,450 | B2 | 5/2015 | Pindiprolu et al. | |
| 10,222,308 | B2 | 3/2019 | Bardapurkar et al. | |
| 11,035,223 | B2 * | 6/2021 | Kabannik | G01V 1/44 |
| 11,078,752 | B2 * | 8/2021 | Costa De Oliveira | E21B 33/08 |
| 11,619,127 | B1 * | 4/2023 | AlTammar | E21B 34/06 166/250.1 |
| 11,754,425 | B2 * | 9/2023 | Newman | F16L 55/48 73/37 |
| 12,306,070 | B2 * | 5/2025 | Bowen | G01S 15/87 |
| 2003/0062155 | A1 * | 4/2003 | Summers | E21B 47/047 166/66 |
| 2007/0206439 | A1 * | 9/2007 | Barolak | E21B 47/005 367/35 |
| 2008/0239872 | A1 * | 10/2008 | Miller | E21B 47/18 367/83 |
| 2010/0126718 | A1 * | 5/2010 | Lilley | E21B 37/00 166/253.1 |
| 2011/0267922 | A1 * | 11/2011 | Shampine | E21B 47/107 367/25 |
| 2012/0018150 | A1 * | 1/2012 | Shampine | F04B 23/06 417/63 |
| 2013/0110403 | A1 * | 5/2013 | Krivosheev | G01V 3/30 702/7 |
| 2014/0056101 | A1 * | 2/2014 | Vu | E21B 47/005 367/35 |
| 2014/0338896 | A1 * | 11/2014 | McGarian | E21B 47/10 166/250.08 |
| 2015/0007976 | A1 | 1/2015 | Godager | |
| 2016/0017705 | A1 * | 1/2016 | Krivosheev | G01V 3/30 367/33 |
| 2016/0024907 | A1 * | 1/2016 | Krivosheev | E21B 28/00 166/253.1 |
| 2016/0369620 | A1 * | 12/2016 | Pelletier | E21B 23/14 |
| 2017/0292902 | A1 * | 10/2017 | Bardapurkar | E21B 49/003 |
| 2018/0010438 | A1 * | 1/2018 | Ravi | E21B 33/14 |
| 2018/0135405 | A1 * | 5/2018 | Fouda | G01V 3/34 |
| 2018/0245424 | A1 * | 8/2018 | Stokley | E21B 47/092 |
| 2018/0313206 | A1 * | 11/2018 | Dirksen | E21B 47/00 |
| 2019/0360321 | A1 * | 11/2019 | Pearl, Jr. | E21B 47/005 |
| 2019/0383130 | A1 * | 12/2019 | Fox | G01V 1/40 |
| 2020/0182042 | A1 | 6/2020 | Pearl, Jr. et al. | |
| 2021/0032957 | A1 * | 2/2021 | Osborne | E21B 47/135 |
| 2021/0032973 | A1 * | 2/2021 | Gkortsas | G01V 1/50 |
| 2021/0032984 | A1 * | 2/2021 | Kabannik | E21B 47/095 |
| 2021/0062640 | A1 * | 3/2021 | Demidov | E21B 47/095 |
| 2021/0238979 | A1 * | 8/2021 | Stokely | E21B 47/12 |
| 2021/0238981 | A1 * | 8/2021 | Maida, Jr. | E21B 33/14 |
| 2021/0238984 | A1 * | 8/2021 | Maida, Jr. | E21B 47/005 |
| 2021/0238985 | A1 * | 8/2021 | Yerubandi | E21B 47/135 |
| 2021/0238987 | A1 * | 8/2021 | Leblanc | E21B 47/135 |
| 2023/0220944 | A1 * | 7/2023 | Newman | G01S 15/08 137/15.07 |
| 2024/0035355 | A1 * | 2/2024 | Demidov | G01V 1/50 |
| 2024/0035371 | A1 * | 2/2024 | Demidov | E21B 47/095 |
| 2025/0109679 | A1 * | 4/2025 | Krueger | E21B 47/107 |

\* cited by examiner

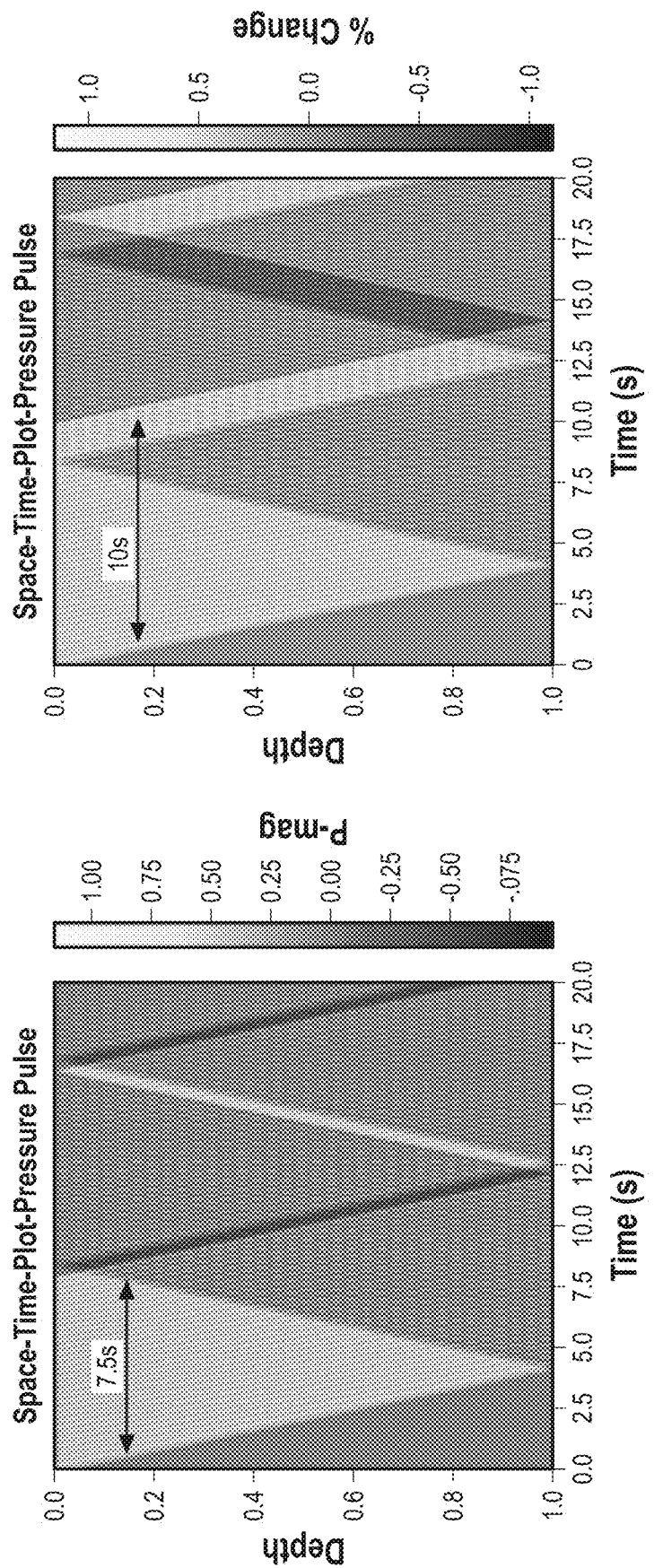

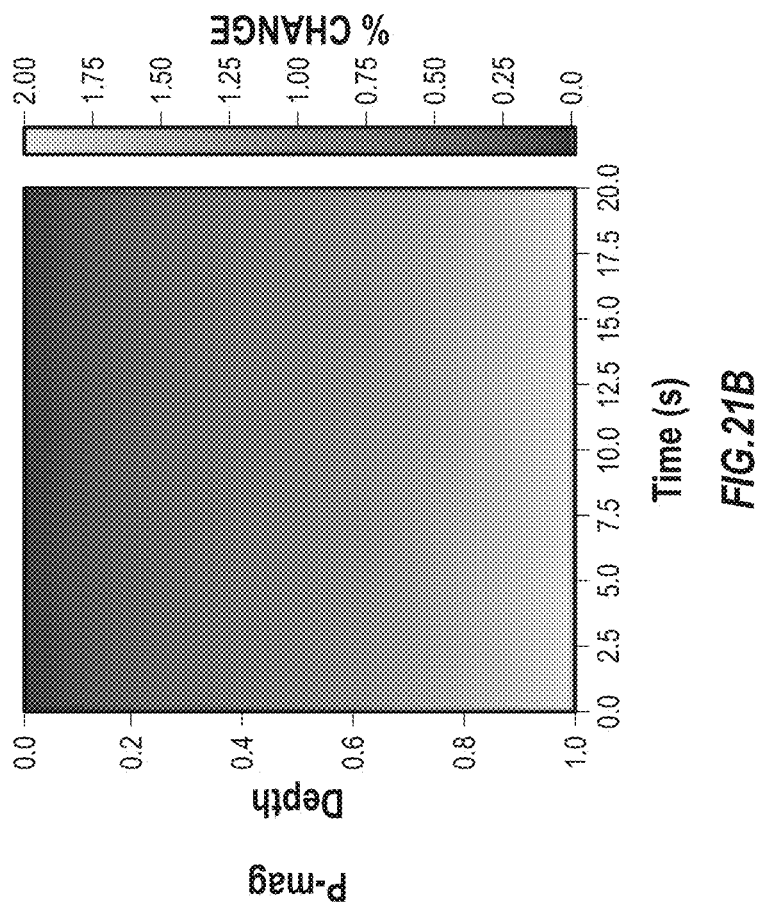
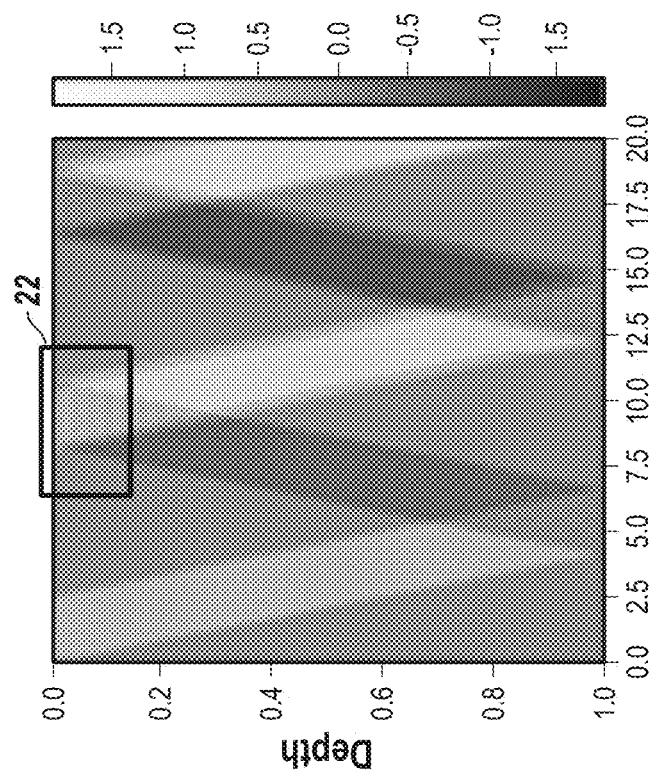
FIG. 21B
FIG. 21A

REMOTE DETECTION OF TOP OF CEMENT USING ENERGY PULSES

BACKGROUND

Natural resources such as gas, oil, and water residing in a subterranean formation or zone may be recovered by drilling a wellbore into the subterranean formation while circulating a drilling fluid in the wellbore. After terminating the circulation of the drilling fluid, a string of pipe (e.g., casing) can be run in the wellbore. The drilling fluid may then be circulated downward through the interior of the pipe and upward through the annulus, which is located between the exterior of the pipe and the walls of the wellbore. Next, primary cementing is typically performed whereby a cement composition is placed in the annulus and permitted to set into a hard mass (i.e., sheath) to thereby attach the string of pipe to the walls of the wellbore and seal the annulus. The highest point of the set cement in the annulus may be referred to as "top of cement" ("TOC"). It may be important to determine the TOC in the annulus for a number of reasons, including establishing proper zonal isolation, proper casing support, and/or regulatory compliance.

BRIEF DESCRIPTION OF THE DRAWINGS

These drawings illustrate certain aspects of some of the embodiments of the present disclosure and should not be used to limit or define the disclosure.

FIG. 16 illustrates a space-time plot of multiple Gaussian pulses at a first transmission time where the pulse transmission time is less than the time taken by the pulse to return to surface, leading to no overlap between the incident and reflected pulse in accordance with some embodiments of the present disclosure.

FIG. 17 illustrates a space-time plot of multiple Gaussian pulses at a second transmission time where the pulse transmission time is more than the time taken by the pulse to return to surface, leading to an overlap between the incident and reflected pulse near the surface with constructive and destructive interference in accordance with some embodiments of the present disclosure.

FIGS. 21a and 21b illustrate space-time plots of multiple pulses spaced apart in accordance with some embodiments of the present disclosure.

DETAILED DESCRIPTION

Disclosed herein are methods and systems for detecting top of cement in well operations and, more particularly, disclosed are example methods and system that determine the top of cement ("TOC") using reflected energy pulses that traveled through the displacement fluid the casing during the wait-on-cement period.

As mentioned above, TOC is the highest point of the set cement in a wellbore annulus. To detect TOC, a variety of techniques may be employed. One technique involves running a cement bond long to ascertain quality of the cement sheath and also identify TOC. While cement bond logs can be used to identify TOC, they require running a tool into the borehole. In addition, cement bond logs are typically run after the wait-on-cement period. The wait-on-cement period is the time spent waiting for the cement composition to set, hardening and developing compressive strength. The wait-on-cement period can range from several hours to days. Delaying identification of TOC until after the wait-on-cement period and requiring a trip into the borehole with a tool can add expense to a cementing operation. It would be advantageous to identify the TOC non-invasively without requiring running a tool into the borehole. Additionally, it would be advantageous to utilize rig time to avoid initiating operations to determine TOC after the wait-on-cement period.

Example embodiments that determine TOC using reflected energy pulses employ a non-invasive technique for TOC determination. In addition, the example embodiments that use the reflected energy pulses also take advantage of the wait-on-cement period to collect data for the TOC determination. Example techniques may introduce energy signals (e.g., pressure waves, acoustic, electromagnetic signals, light signals, etc.) into the cement displacement fluid in the casing and capturing the reflected energy signals returned to the surface during the wait-on-cement period. Because the cement will release heat during setting, the cement displacement fluid, which is present in the casing will also heat over time during the wait-on-cement period. By capturing these reflected energy signals during the wait-on-cement period, the coupling between the acoustic properties of the cement displacement fluid and the temperature evolution of the borehole of time may be used to determine TOC in the annulus. For example, the temperature gradient in the displacement fluid, will also setup a gradient in acoustic velocity in the displacement fluid. The acoustic velocity is a function of fluid density and bulk modulus, which are changing as a function of temperature. When energy is sent in the form of signals through the displacement fluid in the casing, and capture back the reflected signals at surface, these contain some signature of the top of cement. These reflected signals and their properties (e.g., amplitude, phase shift, frequency) may be recorded over time and processed to determine the TOC.

Figure 1:
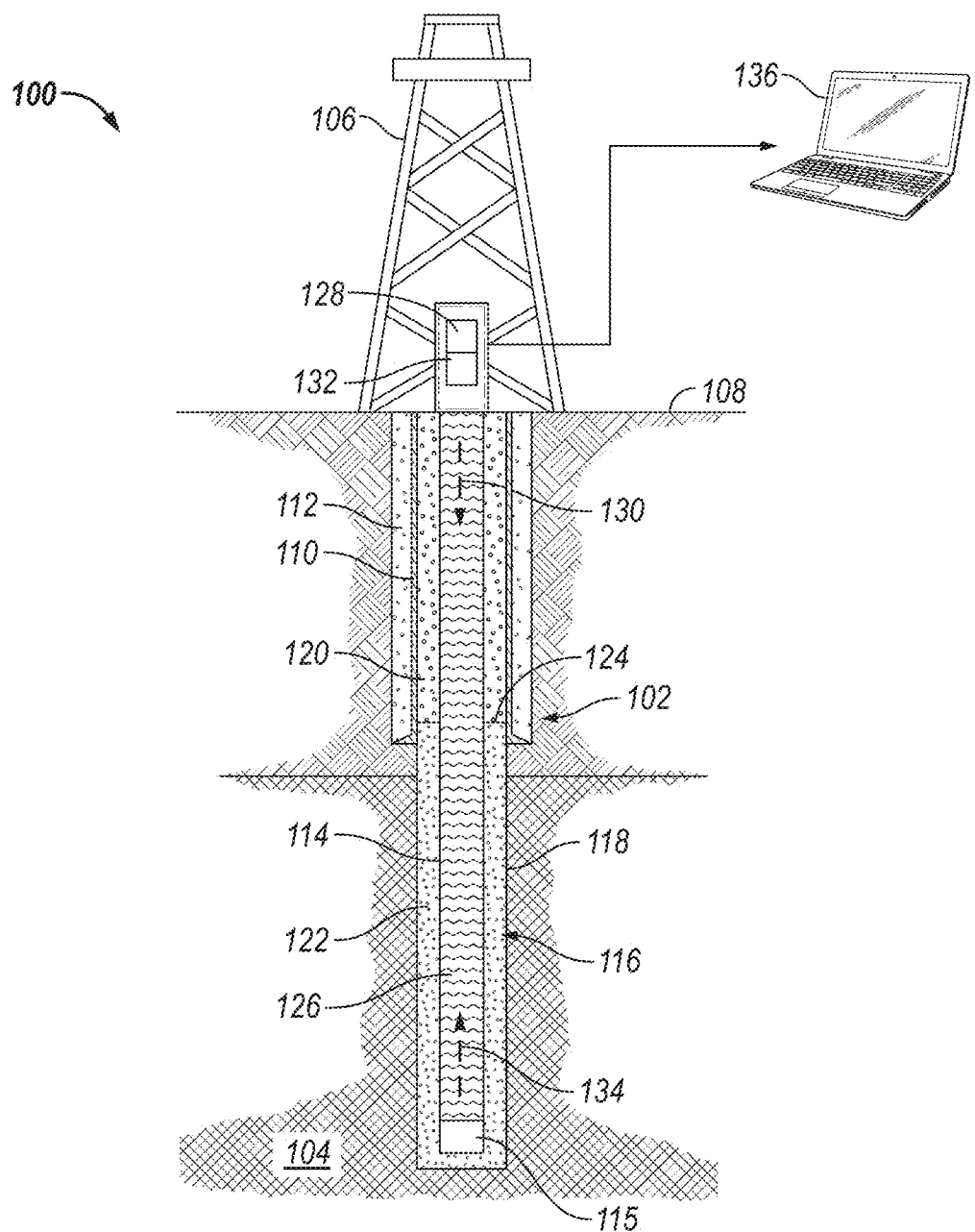
FIG. 1 illustrates an example well environment in accordance with some embodiments of the present disclosure.

FIG. 1 is an example borehole environment 100 in accordance with example embodiments. As illustrated, a borehole 102 may be drilled into the subterranean formation 104. In the illustrated embodiment, there is a rig 106 mounted at the surface 108 and positioned above the borehole 102. One or more pipe strings may be positioned in borehole 102, including surface casing 110. Surface casing 110 may be cemented into borehole 102, for example, by cement sheath 112. In the illustrated embodiment, one or more additional pipe strings, shown here as casing 114 may also be disposed in borehole 102. There is an annulus 116 formed between casing 114 and walls 118 of borehole 102 and/or surface casing 110 (or other outer casing). Annulus 116 may contain a spacer fluid 120 and a cement composition 122. Spacer fluid 120 may be positioned above cement composition 122 in annulus 116. The interface between spacer fluid 120 and cement composition 122 may be TOC 124. Cement displacement fluid 126 may at least partially fill casing 114. In addition, a signal generator 128 may also be positioned at surface 108 for sending input energy signals 130 into borehole 102 through cement displacement fluid 126 in casing 114. Receiver 132 that also may be positioned at surface 108 may capture reflected energy signals 134 for transmission to information handling system 136 for determining the location of TOC 124 in borehole 102.

Borehole 102 is a hole in the ground, for example, through which natural resources may be extracted from subterranean formation 104. Borehole 102 may also allow injection of fluids into subterranean formation 104. Borehole 102 may be partially or fully lined with casing (e.g., surface casing 110, casing 114, etc.) to protect the surrounding ground from the contents of borehole 102, and conversely, to protect borehole 102 from the surrounding ground. While borehole 102 is shown extending generally vertically into subterranean formation 104, example embodiments are also applicable to boreholes that extend at an angle through the subterranean formation 104, such as horizontal and slanted boreholes.

Rig 106 is an integrated system for drilling and/or completing borehole 102. Rig 106 may include a variety of equipment to enable drilling, including a platform, derrick, crown block, traveling block, and wellhead.

Surface casing 110 and casing 114 are conduits that are inserted into borehole 102. Surface casing 110 and casing 114 may each be an assembly of pipe segments (e.g., a pipe string) that can be inserted into the borehole. Casing 114 that is cemented in place performs a variety of functions, including providing zonal isolation and borehole 102 stabilization, among others. Surface casing 110 and/or casing 114 may not always be cemented all the way to surface 108. Top plug 115 may be positioned in casing 114. Top plug 115 may separate the cement composition 122 from the cement displacement fluid 126.

Spacer fluid 120 may be inserted into borehole 102 before cement composition 122. Spacer fluid 120 may be designed, for example, to clean and prepare borehole 102 for cement composition 122. Spacer fluid 120 in borehole 102 may be positioned between cement composition 122 and drilling fluid (not shown). Spacer fluid 120 may have any suitable composition. Examples of spacer fluid 120 may include a carrier fluid, which is typically water. The water in spacer fluid 120 may include, for example, a freshwater, saltwater (e.g., water containing one or more salts dissolved therein), brine (e.g., saturated saltwater produced from subterranean formations), seawater, or any combination thereof. One or more additional additives may also be included in spacer fluid 120, including a viscosifier, wetting agent, and/or surfactant, among others.

Cement composition 122 is introduced into borehole 102 as a slurry then transitions to a set cement after placement into annulus 116. Among other things, cement composition 122, when set, supports and positions casing 114 in borehole 102. For placement, cement composition 122 may be pumped down the inside of casing 114. Cement displacement fluid 126 may force cement composition 122 down through the bottom of casing 114 and then up around casing 114 into the annulus 116. The uppermost point of cement composition in borehole 102 is TOC 124. TOC 124 may be quantified various ways, including through use of cement bond logs, sonic logs, ultrasonic logs, and temperature surveys. As previously discussed, there are several reasons that TOC 124 needs to be determined. Cement composition 122 may have any suitable composition. Example embodiments may include water and a hydraulic cement, including Portland cements, pozzolana cements, gypsum cements, high-alumina-content cements, slag cements, silica/lime cements, and combinations thereof. Non-hydraulic cements may also be used, such as magnesium oxychloride cements.

Cement displacement fluid 126 may be the same or different than spacer fluid 120. Cement displacement fluid 126 may be inserted into casing 114 after cement composition 122, for example, to force cement composition 122 out of casing 114 and into annulus 116. Cement displacement fluid 126 remains in casing 114 while cement composition 122 is setting. Cement displacement fluid 126 should heat while it is static in casing 114. Heat sources include subterranean formation 104 and heat from the exothermic hydration reactions during setting of cement composition 122. Accordingly, the portion of cement displacement fluid 126 in casing 114 at cement composition 122 should heat faster due to the exothermic hydration reactions than the portion of cement displacement fluid 126 above cement composition 122. Cement displacement fluid 126 may have any suitable composition. Examples of cement displacement fluid 126 may include a carrier fluid, which is typically water. The water in cement displacement fluid 126 may include, for example, a freshwater, saltwater (e.g., water containing one or more salts dissolved therein), brine (e.g., saturated saltwater produced from subterranean formations), seawater, or any combination thereof. One or more additional additives may also be included in cement displacement fluid 126, including a viscosifier, wetting agent, and/or surfactant, among others.

Signal generator 128 may be positioned to emit input energy signals 130 into cement displacement fluid 126 in the casing 114. The input energy signals 130 may be emitted over time, for example, during the wait-on-cement period. In some embodiments, the emission of input energy signals 130 may begin after pumping of cement composition 122 is stopped. As illustrated, signal generator 128 may be positioned over casing 114 at surface 108, in some embodiments. However, signal generator 128 may otherwise be positioned so that it can emit input energy signals 130 into cement displacement fluid 126 that then travel down the column of cement displacement fluid 126 in casing 114. Examples of suitable signal generator 128 may include acoustic wave generators, electromagnetic wave generators, and light generators. Acoustic wave generators are devices that generate sound waves, which may be ultrasonic, sonic, or subsonic. The sound waves may also be considered pressure pulses in general, for example, pressure (acoustic) waves may be introduced into the borehole 102 with the acoustic wave generators. For example, the acoustic wave generator may include a transducer (e.g., magneto strictive transducer, piezoelectric transducer, etc.) that generates acoustic waves in cement displacement fluid 126. In some embodiments, the acoustic wave generator may include a pressure wave generator. Electromagnetic wave generators are devices that generate electromagnetic waves. The electromagnetic wave may be sent down through the casing 114 and/or cement displacement fluid 126. The electromagnetic wave generator may be an AC generator or DC generator. The electromagnetic field generator may be any suitable device that generates the electromagnetic waves from electric current. Light generators are devices that emit light waves. Examples of suitable light generators may include LEDs and lasers, among others.

Input energy signals 130 may travel down the column of cement displacement fluid 126 in casing 114. Example of suitable input energy signals 130 may include acoustic waves, electromagnetic waves, and light waves. As cement composition 122 sets and releases heat of hydration, cement displacement fluid 126 will heat. This will impact the behavior of input energy signals 130 as they travel through cement displacement fluid 126. For example, where input energy signals 130 are in the form of acoustic waves, the speed at which these input energy signals 130 travel though the displacement fluid and back to the surface after reflection should change over time as cement displacement fluid 126 is heated, and hence changes in the acoustic velocity of the displacement fluid are induced. By way of further example, where input energy signals 130 are in the form of electromagnetic waves, the input energy signals 130 may travel down the casing 114 and/or cement displacement fluid 126. The transit time of the electromagnetic waves may also be used, for example, in TOC determination. Various properties of the electromagnetic waves may change with heat, including, refractive index, absorption and attenuation, and scattering. By way of further example, where input energy signals 130 are in the form of light waves, the light waves may be blue light with a wavelength from about 280 nm to about 500 nm. In some embodiments, the light waves may be violet light with a wavelength of about 380 nm to about 435 nm. In some embodiments, the blue light may have a frequency of about 600 to about 750 THz. By way of further examples, where input energy signals 130 are in the form of light waves, the light waves may be blue light with a wavelength from about 500 nm to about 570 nm. In some embodiments, the green light may have a frequency of about 530 to about 600 THz.

Properties of input energy signals 130 may be selected, for example, to enable determining TOC 124. The properties may include frequency, amplitude, wavelength, wave speed, and/or attenuation. Large amplitude energy signals, for example, may enable recovery of a cleaner reflected energy signals 134, but may cause acoustics to go into the nonlinear regime, which could complicate modeling. Low amplitude signals, for example, may maintain the signals in the linear regime, resulting in easier computational modeling and avoidance of nonlinear effects. For input energy signals 130 in the form of sound waves, the frequencies may be less than 100 Hz, for example ranging from 5 Hz to 100 Hz. The waveforms of input energy signals 130 may have any suitable shape, including a Gaussian distribution (i.e., Gaussian pulses), The input energy signals 130 may be emitted as a signal pulse (e.g., signal Gaussian pulse) or multiple pulses (e.g., multiple Gaussian pulses). Additional shapes for the input energy signals may include sine waves, sawtooth patterns, square waves, and chirp signals with a mixture of frequencies.

Receiver 132 may be positioned to record one or more properties of reflected energy signals 134. As illustrated, receiver 132 may be positioned over casing 114 at surface 108, in some embodiments. However, receiver 132 may otherwise be positioned so that it can record one or more properties of reflected energy signals 134. Examples of receiver 132 may include acoustic wave receivers, electromagnetic wave receivers, and light detectors. In some embodiments, the receiver 132 may include an ultrasonic transducer that converts the detected acoustic energy to electric energy, for example, with a piezoelectric element. From the recorded signal, various properties of the reflected energy signals 134, including time of flight, phase shift, frequency content, and attenuation. Time of flight is the time it took the energy to travel in borehole 102, for example, time for input energy signals 130 to travel down casing 114 then for reflected energy signals 134 to be received.

Reflected energy signals 134 may travel to receiver 132 after input energy signals 130 are reflected from the top plug 115, for example, at the end of casing 114. The reflections from the top plug 115 are of interest, but some input energy signals 130 can also be reflected from casing walls, which typically are not of interest. Since the input energy signal 134 would be travelling axially along the casing 114 it will reflect from the bottom most end of the casing 114, which should be the top plug 115. Input energy signals 130 may reflect, for example, at different points in casing 114 with reflected energy signals 134 traveling upwards in casing 114 to surface 108. While not shown, a plug may be positioned at the bottom of the casing 114 that reflects input energy signals 130.

Information handling system 136 may include any instrumentality or aggregate of instrumentalities operable to compute, estimate, classify, process, transmit, broadcast, receive, retrieve, originate, switch, store, display, manifest, detect, record, reproduce, handle, or utilize any form of information, intelligence, or data for business, scientific, control, or purposes. For example, an information handling system 136 may be a personal computer, a network storage device, or any other suitable device and may vary in size, shape, performance, functionality, and price. Information handling system 136 is shown at surface 108 but may also be remote from borehole environment 100.

Information handling system 136 may include a processing unit for processing reflected signal 134 from receiver 132, discussed below, by executing software or instructions obtained from a local non-transitory computer readable media (e.g., optical disks, magnetic disks). Examples of suitable processing units include a general-purpose processor (e.g., a central processing unit (CPU)), an application specific integrated circuit (ASIC), a programmable gate array (PGA), a field programmable gate array (FPGA), a digital signal processor (DSP), and any digital or analog circuit configured to perform operations based on input data (e.g., execute program instructions). The non-transitory computer readable media may store software or instructions of the methods described herein. Non-transitory computer readable media may include any instrumentality or aggregation of instrumentalities that may retain data and/or instructions for a period of time. Non-transitory computer readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 136 may also include input device(s) (e.g., keyboard, mouse, touchpad, etc.) and output device(s) (e.g., monitor, printer, etc.).

Information handling system 136 may be communicatively coupled with receiver 132 to receive measurements of reflected energy signals 134. Any suitable technique may be used for coupling information handling system 136 with receiver 132 including a wired or wireless connection. The measurements may be direct or indirect measurements. Information handling system 136 may determine TOC 124, for example, based on the one or more measurements of reflected energy signals 134 and thermal behavior of cement displacement fluid 126 in casing 114. The thermal behavior of cement displacement fluid 126 may be modeled, for example, with a wellbore temperature simulator than runs on information handling system 136 to provide multiple temperature profiles.

Figure 2A:
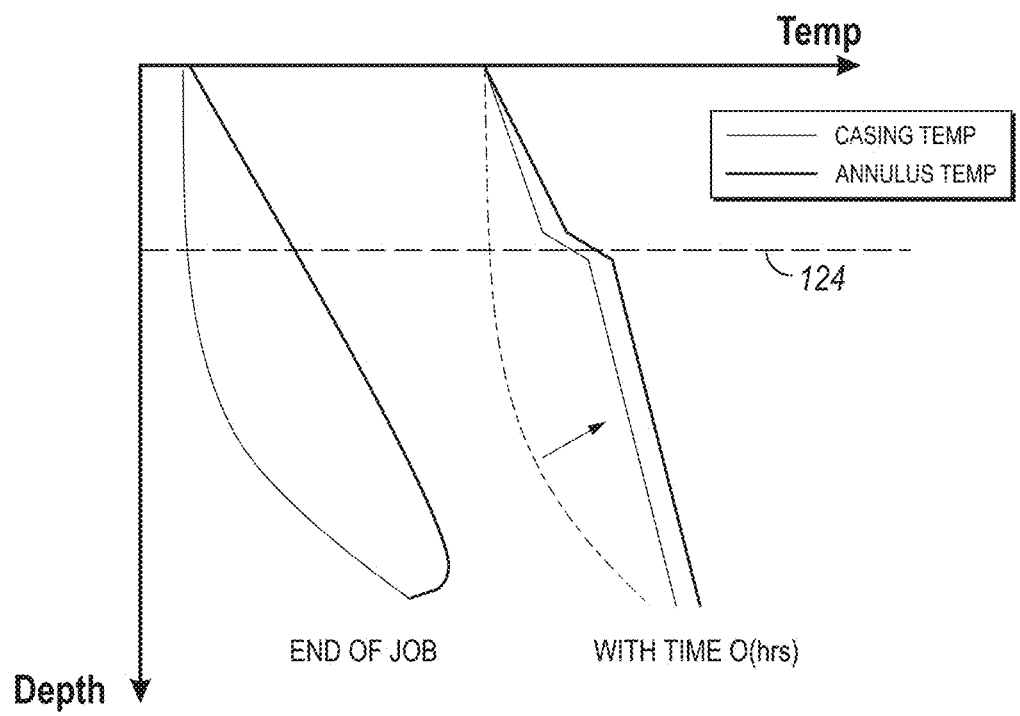
FIGS. 2a, 2b, 2c, and 2d are a series of graphs illustrating the temperature as a function of depth of the casing and annulus fluid in accordance with some embodiments of the present disclosure.

FIG. 2a is a chart of temperature in a borehole (e.g., borehole 102) as a function of depth for a hypothetical cementing operation. The two lines plotted on the left side of the chart are for fluid temperatures in a casing string (e.g., temperature of cement displacement fluid 126 in casing 114) and in an annulus (e.g., temperature of spacer fluid 120 and cement composition 122 in annulus 116) at the end of a cementing job before setting. As illustrated, the temperature in both the casing string and annulus rises as the depth increases, indicating temperatures increase with depth. The three lines plotted on the right side of the chart are for fluid temperatures in the casing string (e.g., temperature of cement displacement fluid 126 in casing 114) and in the annulus (e.g., temperature of spacer fluid 120 and cement composition 122 in annulus 116) after time a specified period of time during the wait-on-cement period during cement setting. TOC 124 is also shown on the chart. As illustrated, there is step change in temperature at TOC 124, indicating that the temperature in the casing string will change over time as the heat of hydration releases during cement setting.

Figure 2B:
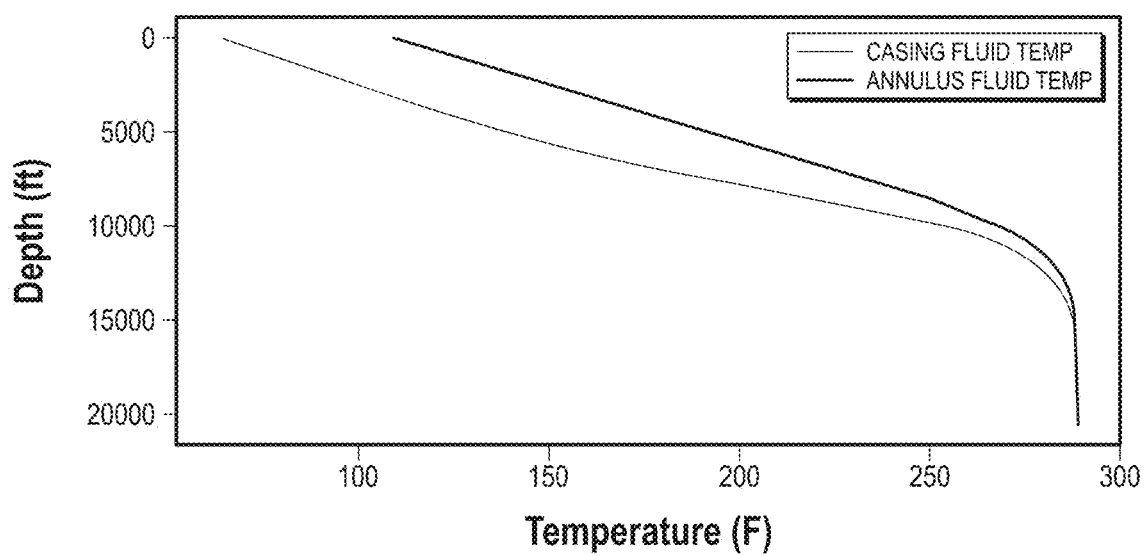
Figure 2C:
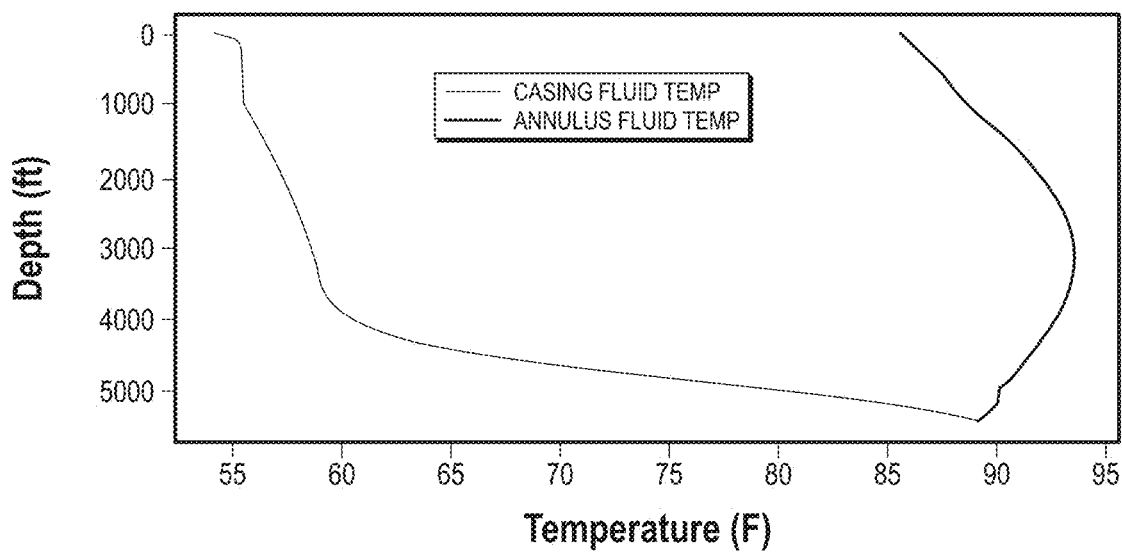
Figure 2D:
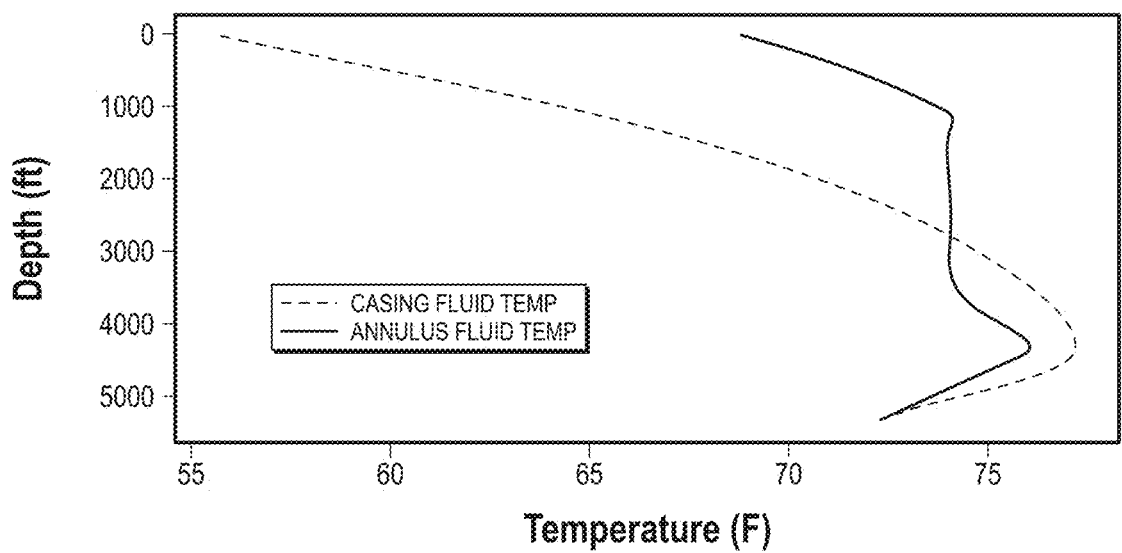

FIGS. 2b-2d are charts of temperature in a borehole (e.g., borehole 102) as a function of depth for a hypothetical cementing operation. The charts may be generated by a temperature simulator, for example. The plotted lines are for the temperature of the borehole fluids (e.g., temperature of spacer fluid 120 and cement composition 122 in annulus 116). FIG. 2b is the temperature profile at approximately 21 minutes. FIG. 2c is the temperature profile at approximately 1 hour and 4 minutes. FIG. 2d is the temperature profile at approximately 2 hours and 11 minutes. As illustrated, the temperature of the casing fluid heats over time as the cement sets. It should be noted that the temperature profiles provided on FIGS. 2b-2d are for different fluids in different downhole environments.

As a result, properties of the displacement fluid (e.g., acoustic velocity) change with temperature, and hence affect the properties of the energy signals (e.g., input energy signals 130 and reflected energy signals 134 on FIG. 1) traveling through the casing (e.g., through cement displacement fluid 126 on FIG. 1) should also change over time with temperature as the cement sets. The signal magnitude also can change over time with temperature as the cement sets. Accordingly, present techniques may take advantage of these changes in the energy signals as they travel down and back up the casing to determine the TOC (e.g., TOC 124 on FIG. 1). For example, acoustic velocities of acoustic waves may change by as much as 2% (e.g., 2%-4%) due to the temperature evolution in the borehole over time as the cement sets.

Figure 3:
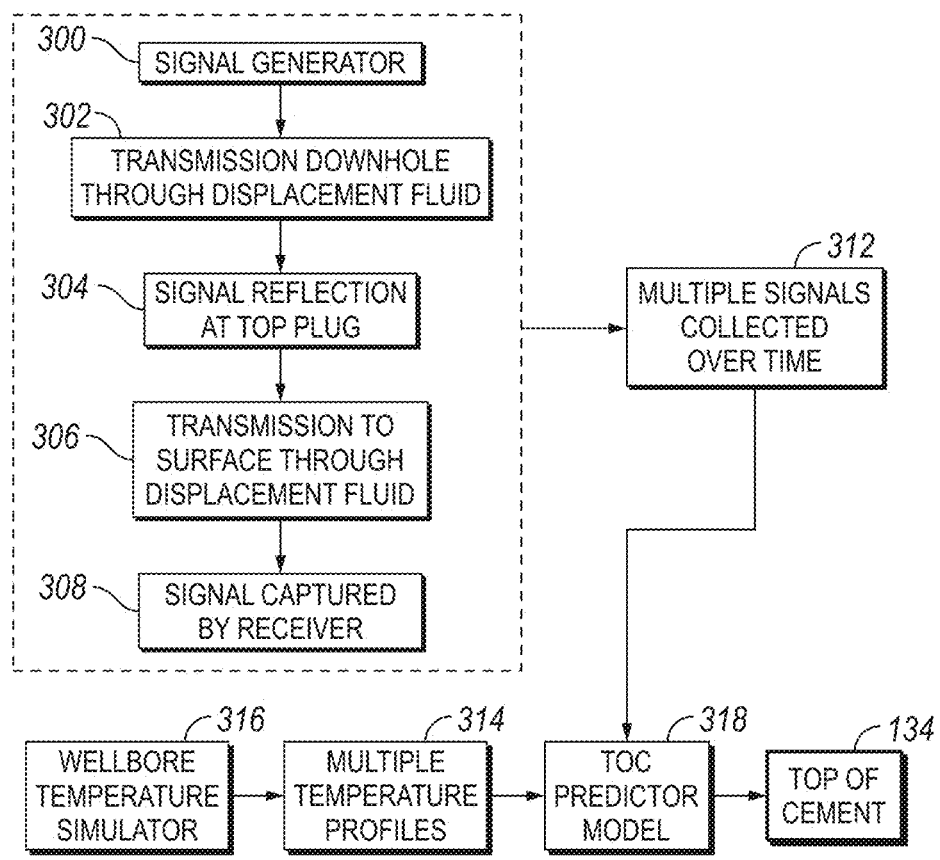
FIG. 3 illustrates a flow chart of a method for determining top of cement in accordance with some embodiments of the present disclosure.

FIG. 3 is a flowchart of a method for determining top of cement in accordance with some embodiments of the present disclosure. All or a portion of the method shown may be performed by one or more components of information handling system 136 or a user thereof. While the various steps in this flowchart are presented and described sequentially, a person of ordinary skill in the relevant art (having the benefit of this detailed description) would appreciate that some or all steps may be executed in different orders, combined, or omitted, and some or all steps may be executed in parallel.

In Step 300, the signal generator 128 emits input energy signals 130 into cement displacement fluid 126 in casing 114. Non-limiting examples of input energy signals 130 may include acoustic waves, electromagnetic waves, and light waves. More details on the input energy signals 130 are described herein, for example, with respect to FIG. 1.

In Step 302, the input energy signals 130 are transmitted through the cement displacement fluid 126 in casing 114. The input energy signals 130 should pass down through the casing 114, including through the portion of the casing 114 surrounded by the cement composition 122. As previously discussed, the cement displacement fluid 126 may be heated in the casing 114, for example, by heat emitted during setting in the wait-on-cement period. This heating may modify one or more properties of the displacement fluid, e.g., the acoustic velocity, which in turn would affect the properties of the input energy signals 130 (time of flight, phase, frequency content, attenuation) passing there through.

In Step 304, the input energy signals 130 may be reflected in casing 114 off the top plug 115 (e.g., shown on FIG. 1). For example, the input energy signals 130 may reflect off a device (e.g., plug) or other interface in casing 114, as previously described.

In Step 306, the reflected energy signals 134 may be transmitted back through cement displacement fluid 126 to surface 108. As the reflected energy signals 134 pass back up the casing 114 after reflection through cement displacement fluid 126. As previously discussed, the cement displacement fluid 126 may be heated in the casing 114, for example, by heat emitted during setting in the wait-on-cement period. This heating may modify one or more properties of the displacement fluid, e.g., the acoustic velocity, which in turn would affect the properties of the input energy signals 130 (time of flight, phase, frequency content, attenuation) passing there through.

In Step 308, the reflected energy signals 134 may be captured by the receiver 132. The receiver 132 may measure (directly or indirectly) one or more properties of reflected energy signals 134. Non-limiting properties may include magnitude, time of flight, phase shift, frequency content, and/or attenuation of the pulse.

Steps 300 to 308 may be repeated so that multiple signals are emitted are emitted with corresponding reflected energy signals 134 being captured. For example, an initial energy signal may be emitted followed by periodic signals emitted over time, for example, during the wait-on-cement period. The signals may be emitted at set intervals or at irregular intervals. In some embodiments, the initial signal may be emitted after the cement has been placed and pumping has stopped.

In Step 310, multiple reflected energy signals 134 may be collected over time. Accordingly, there may be multiple measurements of the one or more properties of reflected energy signals.

In Step 314, multiple temperature profiles may be generated. The temperature profiles may be based on different possible locations for TOC 124 (e.g., shown on FIG. 1) in borehole 102. Temperature profiles may include temperature of cement displacement fluid 126 over time in borehole 102 as cement sets. Temperature profiles may be generated by borehole temperature simulator 316. In one or more embodiments, temperature profiles may be generated by borehole temperature simulator 316 after processing input data. Input data may include, for example, borehole profile, casing geometry, pump rates, borehole fluid properties (e.g., thermal conductivity casing properties (e.g., thermal conductivity), pump rates, thermal profile of the formation (e.g., boundary conditions on temperature obtain by geology), and/or empirical co-relations for the overall heat transfer coefficients. Borehole temperature simulator 316 may use, for example, fluid thermal properties and heat balance equations to determine temperatures profiles in borehole 102 over time as the cement sets. In some embodiments, temperature profiles may include temperature change in borehole 102 as a function of location of TOC 124. FIGS. 2b-2d illustrate temperature profiles that may be generated.

In Step 318, TOC 124 may be determined based on measured properties of reflected energy signals 134 and the temperature profiles. As previously discussed, the reflected energy signals 134 should vary based on location of TOC 124. For example, the setting of the cement should heat cement displacement fluid 126 which would create different temperature profiles in the borehole 102 dependent upon location of TOC 124. The temperature gradient in the cement displacement fluid 126 in casing 114, along the axis of the borehole 102, changes the acoustic velocity of the cement displacement fluid 126, which can be captured by the reflected signals time of flight. The reflected energy signals 134 may be processed based on time of flight to determine TOC 124. Non-limited examples of processing may include (i) comparing pulse magnitudes of reflected energy signals over time with an initial magnitude measurement with differences in pulse magnitudes co-related to the temperature profiles; and/or (ii) including time of flights of reflected energy signals for the collected signals with differences in pulse magnitudes co-related to the temperature profiles.

Figure 4:
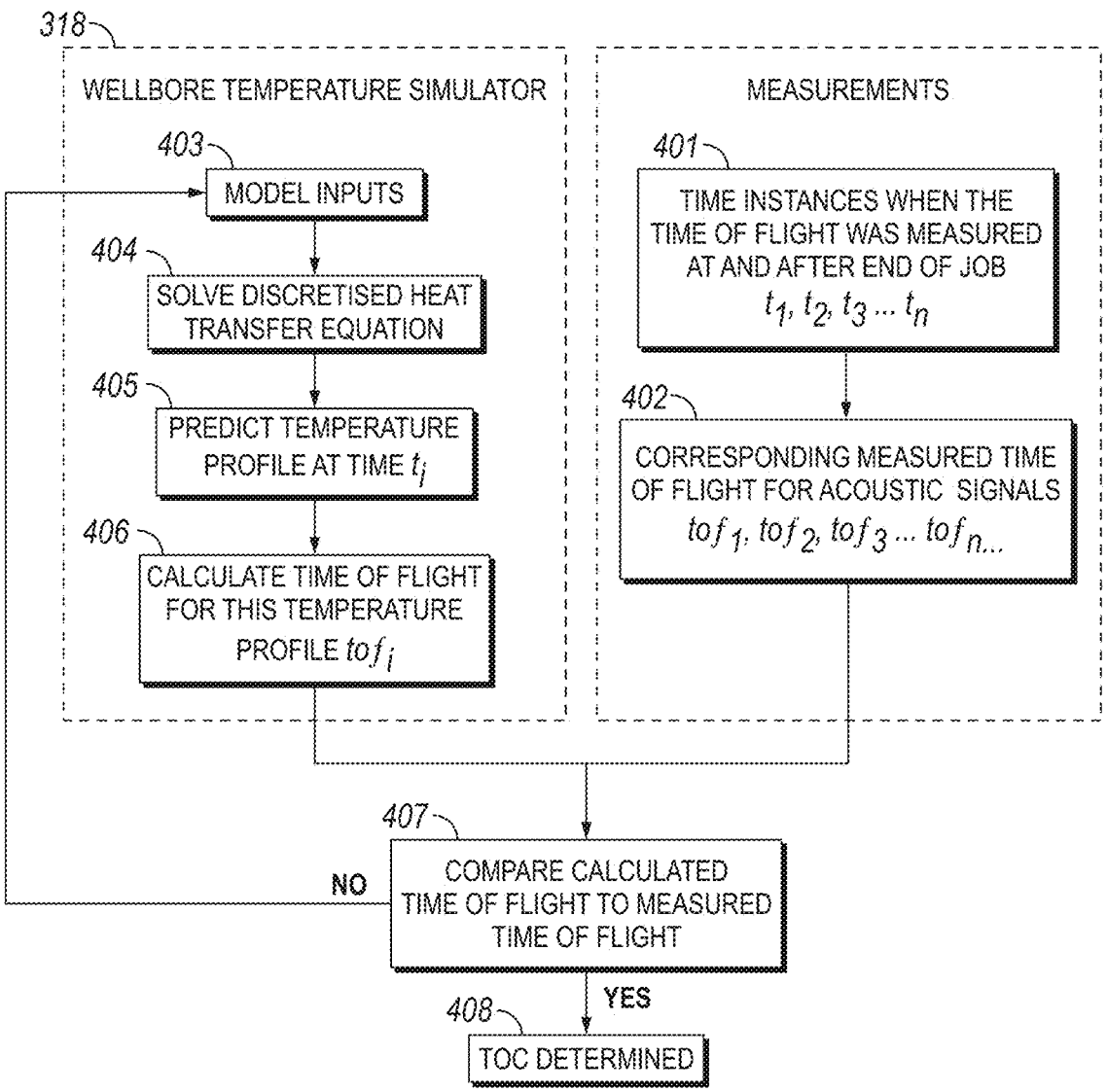
FIG. 4 illustrates a flow chart of a model for determining top of cement in accordance with some embodiments of the present disclosure.

FIG. 4 is a flowchart of a method for determining top of cement in accordance with some embodiments of the present disclosure. All or a portion of the method shown may be performed by one or more components of information handling system 136 or a user thereof. While the various steps in this flowchart are presented and described sequentially, a person of ordinary skill in the relevant art (having the benefit of this detailed description) would appreciate that some or all steps may be executed in different orders, combined, or omitted, and some or all steps may be executed in parallel.

The method uses information obtained from blocks 401 and 402, and wellbore temperature profile predictions from blocks 403-406 together to ascertain the top of cement. Blocks 401 and 402 illustrate various measurements. Block 401 illustrates the time instances when time of flight may be recorded at the end of cementing job. For example, the time of flight may be recorded at 'n' different instances ($t_1$, $t_2$ ... $t_n$). At block 402, the time of flight may be measured for the energy signals (e.g., acoustic signals) transmitted into the borehole 102. The time of flight may be the time for the input energy signals 130 to travel time down the borehole 102 and the reflected energy signals 134 to return to the surface 108. The time of flight may be determined by any suitable technique. For example, timer may be used to calculate the actual time of flight. In addition, the signals themselves could be captured as function of time then used to measure the measured time of flight.

Wellbore temperature simulator 316 receives model inputs at block 403 which may include, for example, borehole geometry, formation properties, fluid positions in casing and annulus (e.g., casing 114 annulus 116 on FIG. 1), which includes top of cement, fluid properties, initial temperature distribution, and/or total time of simulation up to when the temperature profiles need to be simulated for.

At blocks 404 and 405, heat transfer equations may be used, for example, to provide predictions of the temperature profile. At block 404, the heat transfer equations in the wellbore casing, annulus, wellbore fluids, and the surrounding formation may be solved to predict the temperature profile at different times. At block 405, the temperature profile may be predicted at time $t_i$ based on the solved heat transfer equations. At block 406, time of flight may be calculated for the temperature profile from block 405. For example, the predicted temperature profile from block 405 may be used to update the acoustic velocity of the cement displacement fluid 126 in the casing. From this acoustic velocity, time of flight for a simulated pressure signal may be determined.

At block 407, the calculated time of flight from block 406 and a measured time of flight from block 402 may be compared at a given time instant $t_i$. If they match (or are within a present margin of error), the top of cement is confirmed, which is the value that was fed as input to the temperature simulator in block 403. If there is a mismatch, then the top of cement in block 403 is updated and the steps 403-407 are repeated. The time of flight information can be compared in block 407 for individual or for all time instances when it was recorded during the analysis.

Figure 5:
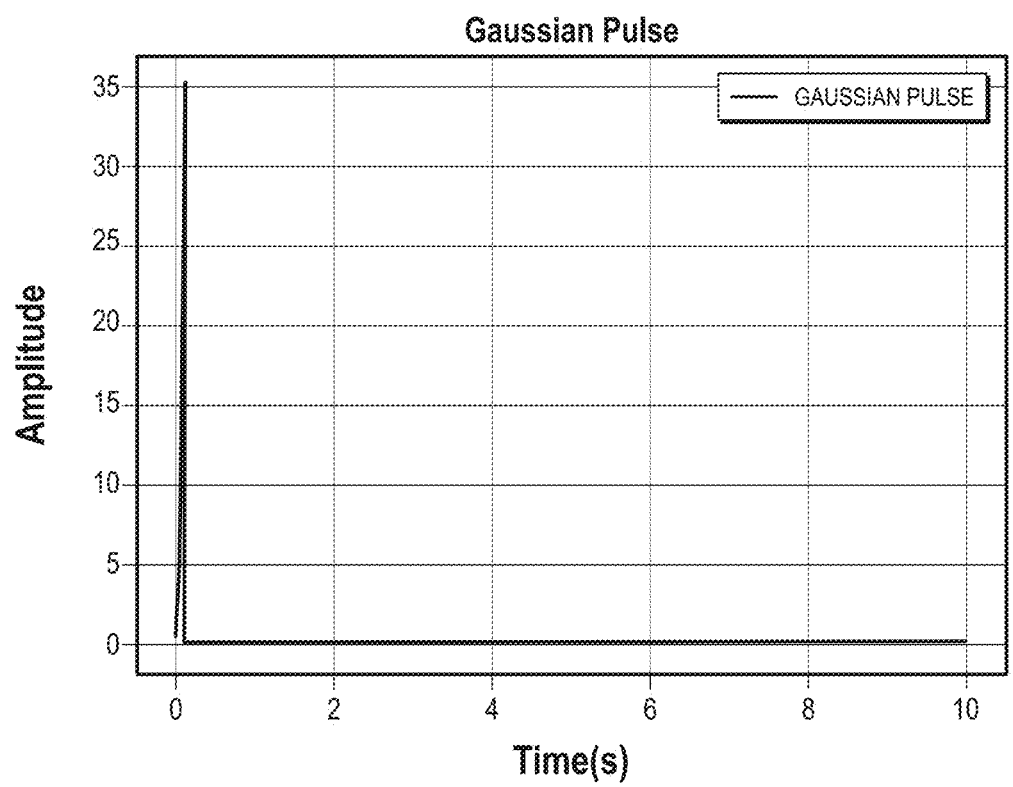
FIGS. 5, 6, 7, and 8 illustrate different forms of energy signals (e.g., pressure signals) that can be transmitted through the casing in accordance with embodiments of the present disclosure.
Figure 6:
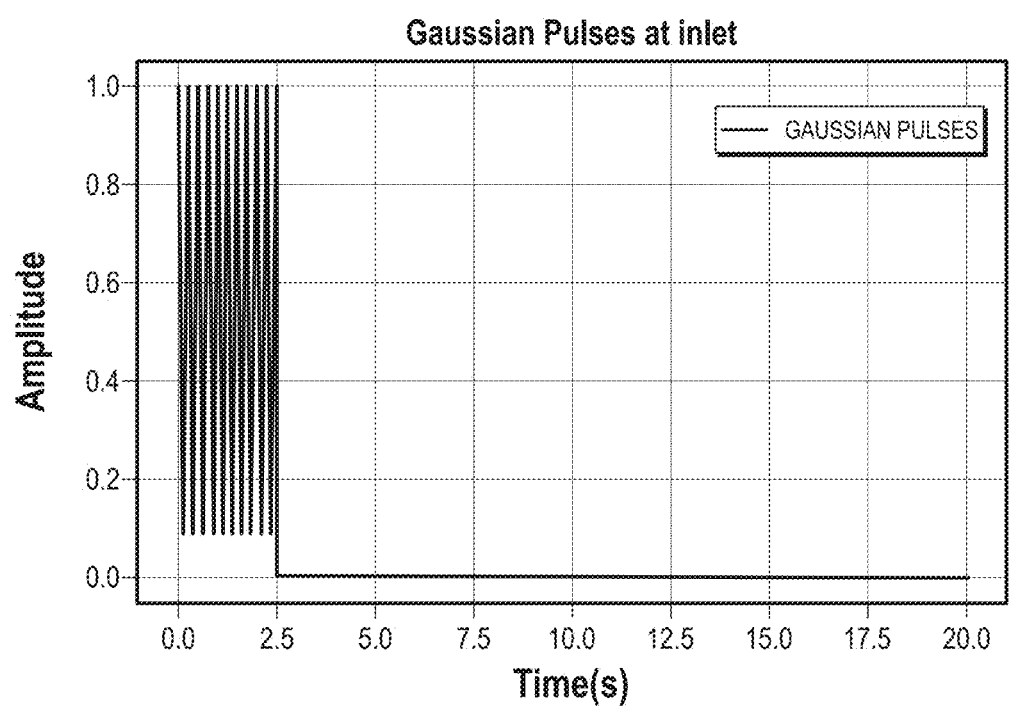
Figure 7:
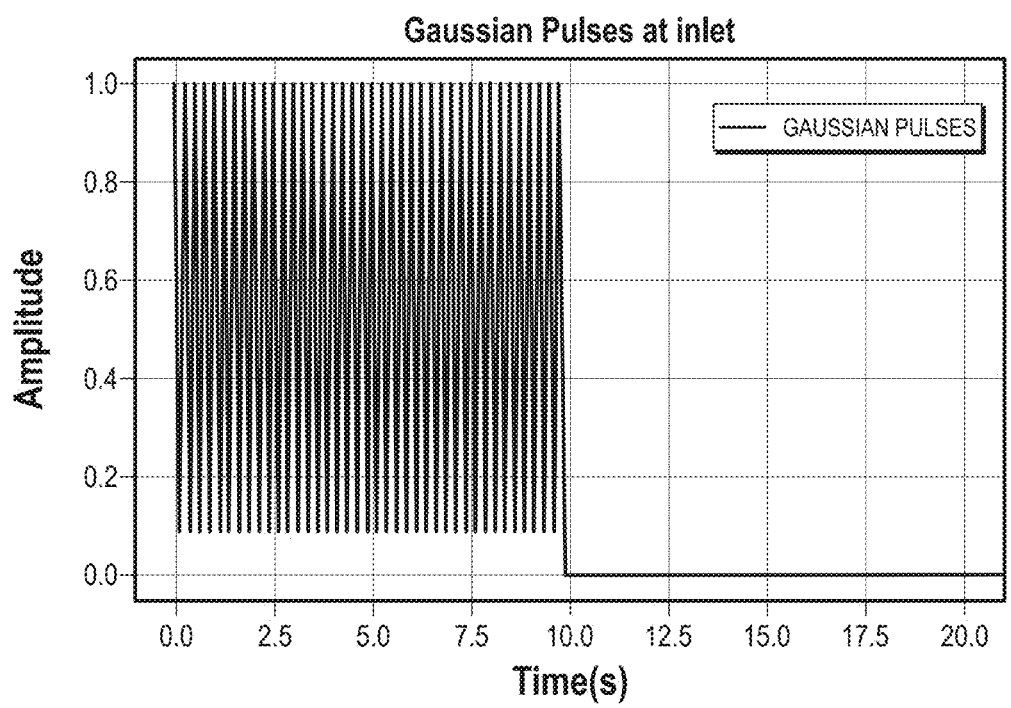
Figure 8:
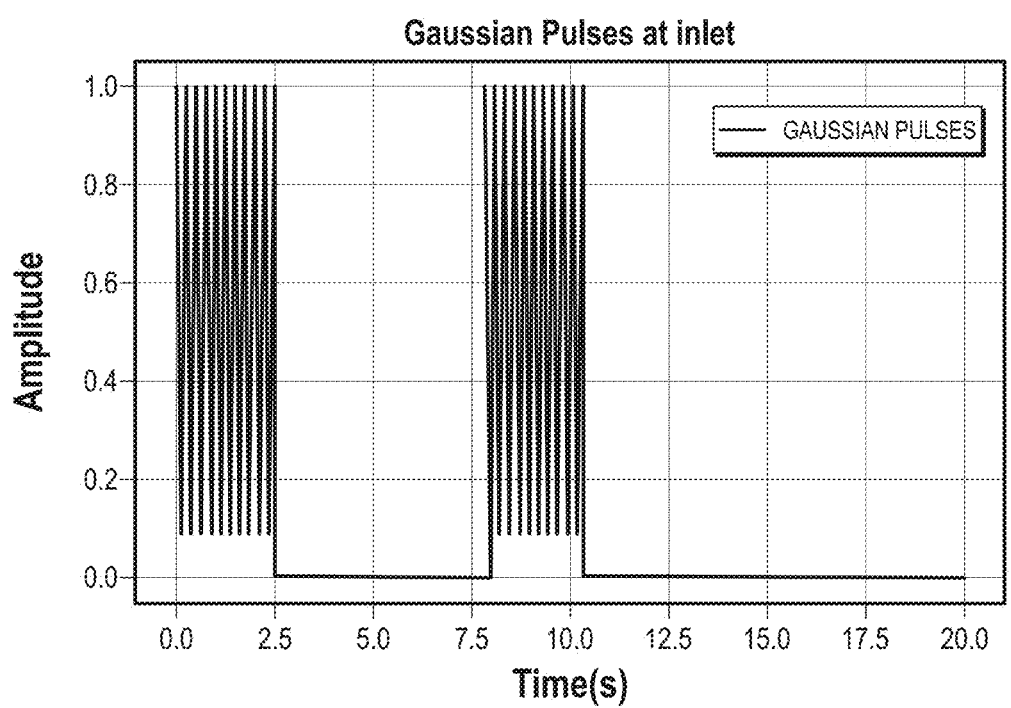

FIGS. 5 to 8 illustrate different forms or patterns for energy signals that can be emitted into a borehole (e.g., input energy signals 130 into borehole 102 on FIG. 1) in accordance with example embodiments. In the embodiments of FIGS. 5 to 8, the energy signals include pressure signals. In particular, FIGS. 5 to 8 are graphs of amplitude as a function time for simulated energy signals. FIG. 5 illustrates an energy signal in the form of a signal Gaussian pulse. FIG. 6 illustrates an energy signal in the form of multiple Gaussian pulses. FIG. 7 illustrates an energy signal in the form of multiple Gaussian pulses with transmission time for the energy signal being greater than time of flight in the borehole. FIG. 8 illustrates an energy signal in the form of multiple Gaussian pulses with the second set of Gaussian pulses emitted at time of flight.

Figures 9A, 9B:
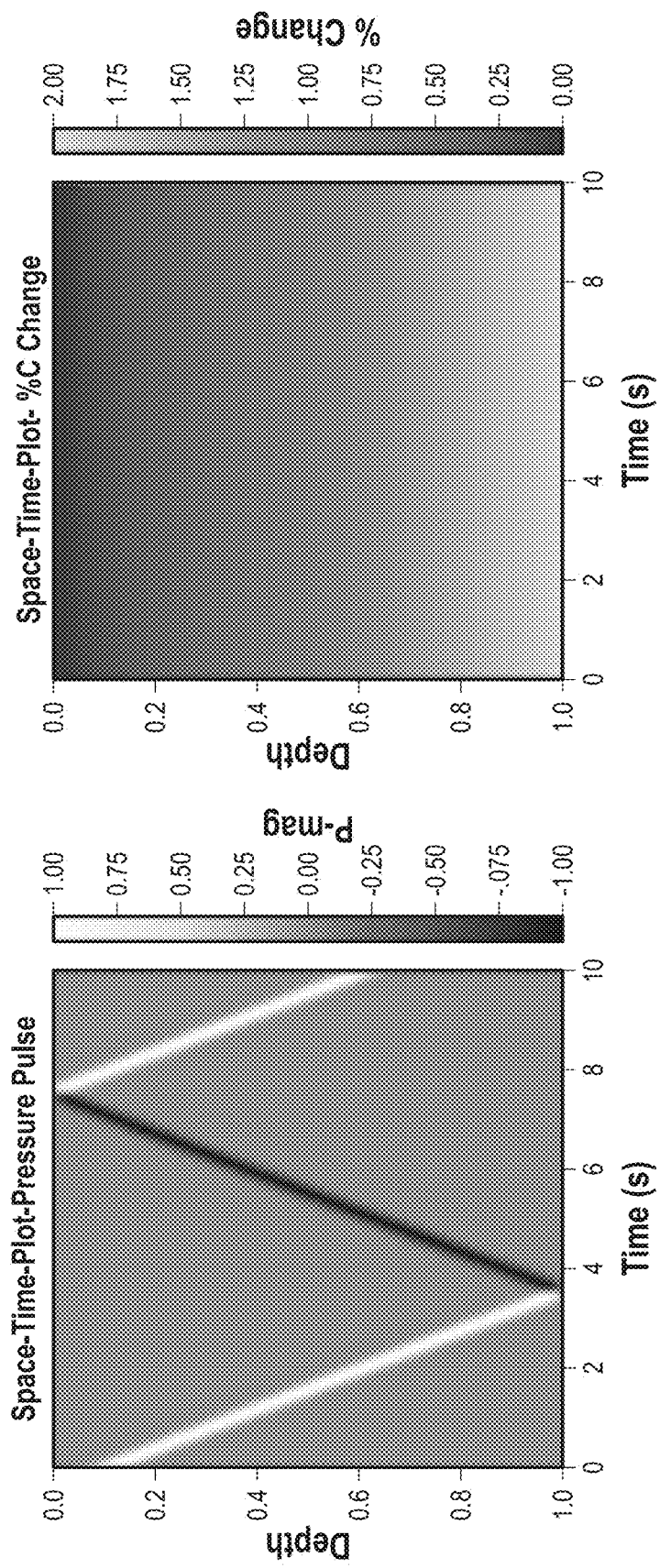
FIGS. 9a and 9b illustrate space-time plots of a single pressure pulse at the end of job in accordance with some embodiments of the present disclosure.

FIGS. 9a and 9b illustrate space-time plots of a simulated acoustic signal including a single pressure pulse in the form of a signal Gaussian pulse in accordance with some embodiments. The single pressure pulse has the form of FIG. 5. The space-time plots on FIGS. 9a and 9b are based on initial simulated measurements of a reflected signal (e.g., reflected signal 134) taken at the end of job. The end of job is reached when fluid circulation in the borehole (e.g., borehole 102 on FIG. 1), for example, the pumping of the displacement fluids (e.g., cement displacement fluid 126 on FIG. 1) has stopped and the top plug 115 (e.g., shown on FIG. 1) has bumped. At the end of the job, the pumps may be shut off giving time for the cement to set. FIG. 9a shows the depth of the pressure pulse as a function of time as it travels in the casing and is reflected back to surface. The magnitude of the pressure pulse is also illustrated in FIG. 9a. FIG. 9b shows percent change in acoustic velocity as a function of depth and time. As illustrated, the acoustic velocity has an increased variance with depth, for example, due to increased borehole temperatures at depth. This an initial measurement so temperatures from setting of the set cement has not yet had an effect on temperature.

Figures 10A, 10B:
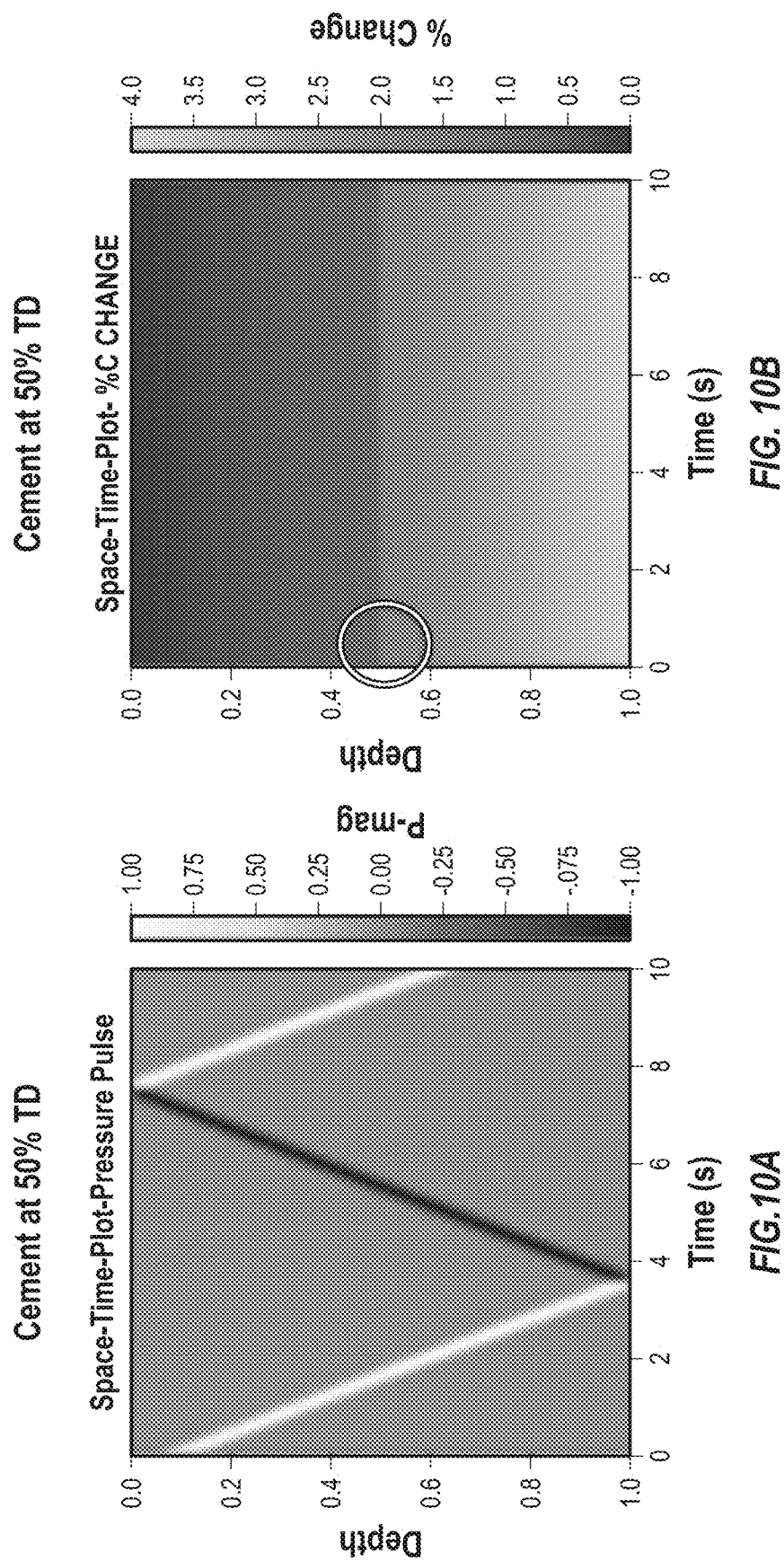
FIGS. 10a and 10b illustrate space-time plots of a single pressure pulse during wait on cement with a top of a cement at a first depth in accordance with some embodiments of the present disclosure.

FIGS. 10a and 10b illustrate space-time plots of the simulated acoustic signal from FIGS. 9a and 9b with measurements taken during the wait-on-cement period with a TOC at first depth in accordance with some embodiments of the present disclosure. The single pressure pulse has the form of FIG. 5. The space-time plots on FIGS. 10a and 10b are based on simulated measurements of the reflected signal (e.g., reflected signal 134) taken during the wait-on-cement period. The pulse magnitudes were compared to the initial measurements of FIGS. 9a and 9b with the differences correlated to temperature profiles from a temperature simulator (e.g., borehole temperature simulator 316 on FIG. 3). FIG. 10a shows the depth of the pressure pulse as a function of time as it travels in the casing and is reflected back to surface. The magnitude of the pressure pulse is also illustrated in FIG. 10a. FIG. 10b shows percent change in acoustic velocity as a function of depth and time. As illustrated, the acoustic velocity has an increased variance with depth, for example, due to increased borehole temperatures at depth. The impact from the heat released from cement hydration can also be seen on FIG. 10b. For example, there is a distinct acoustic velocity gradient caused by the underlying temperature gradient due to the additional heat source that can be seen in FIG. 10b. From this acoustic velocity gradient, the TOC can be identified at approximately 50% depth in the borehole.

Figures 11A, 11B:
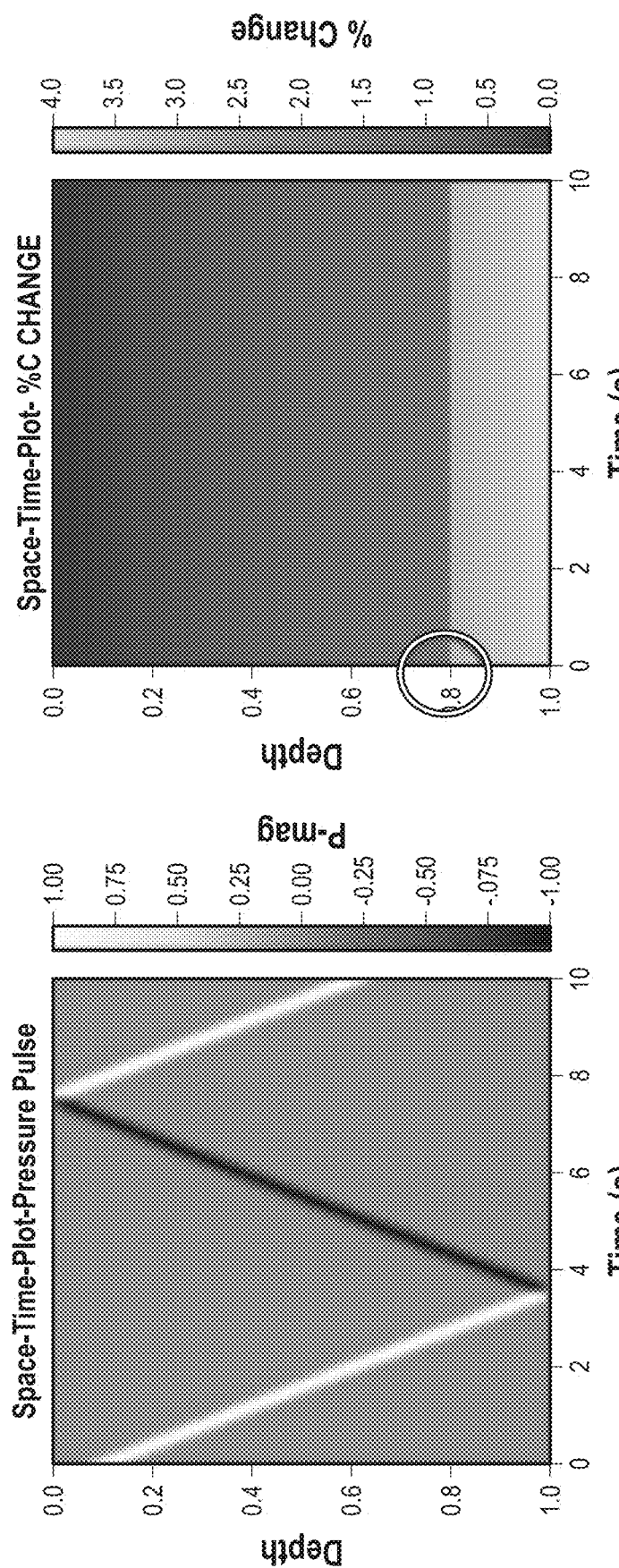
FIGS. 11a and 11b illustrate space-time plots of a single pressure pulse during wait on cement with a top of a cement at a second depth in accordance with some embodiments of the present disclosure.

FIGS. 11a and 11b are similar to FIGS. 10a and 10b and also illustrate space-time plots of the simulated acoustic signal from FIGS. 9a and 9b with measurements taken during the wait-on-cement period in accordance with some embodiments of the present disclosure. The single pressure pulse of the acoustic signal has the form of FIG. 5. However, the simulation for FIGS. 11a and 11b have the TOC at a second depth in the borehole. For example, there is a distinct acoustic velocity gradient on FIG. 11b caused by the heating due to cement hydration, indicating the TOC at the approximate 80% depth.

Figures 12A, 12B:
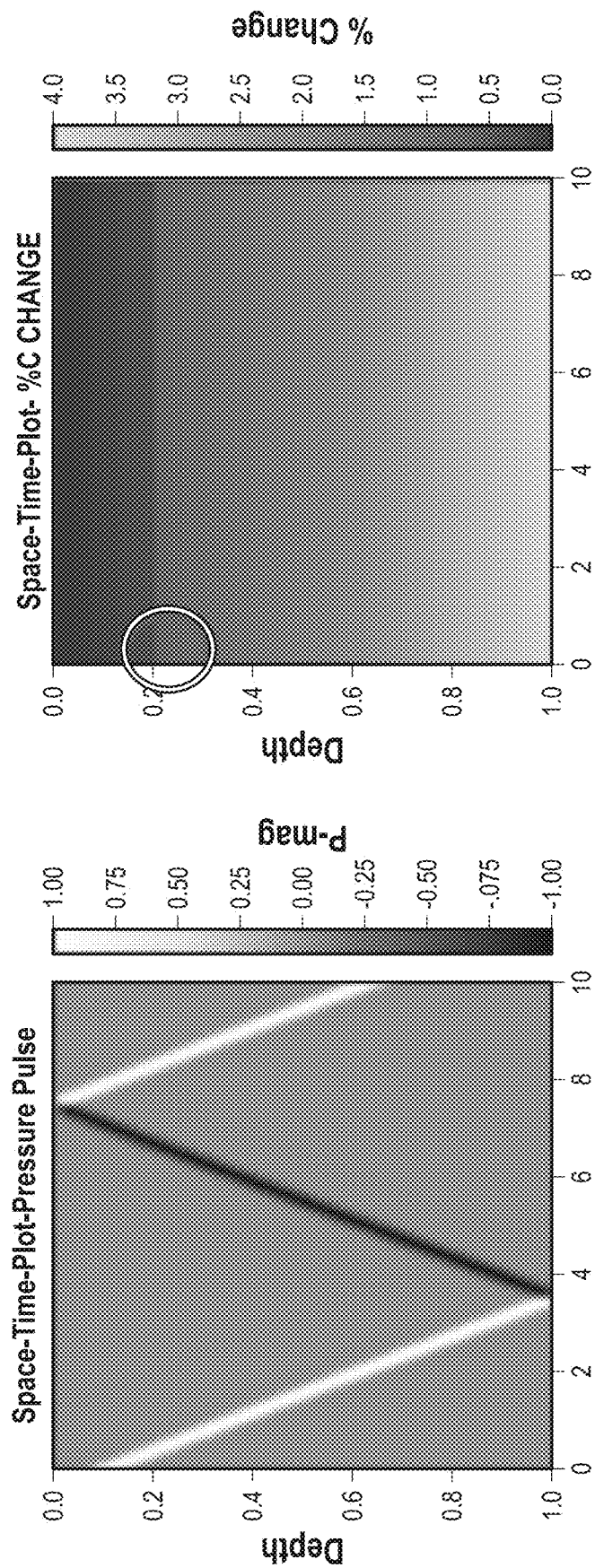
FIGS. 12a and 12b illustrate space-time plots a single pressure pulse during wait on cement with a top of a cement at a third depth in accordance with some embodiments of the present disclosure.

FIGS. 12a and 12b are similar to FIGS. 10a and 10b and also illustrate space-time plots of the simulated acoustic signal from FIGS. 9a and 9b with measurements taken during the wait-on-cement period but with a TOC at a second depth in accordance with some embodiments of the present disclosure. The single pressure pulse has the form of FIG. 5. However, the simulation for FIGS. 12a and 12b have the TOC at a third depth in the borehole. For example, there is a distinct acoustic velocity gradient on FIG. 12b caused by the heating due to cement hydration, indicating the TOC at the approximate 20% depth.

Figure 13:
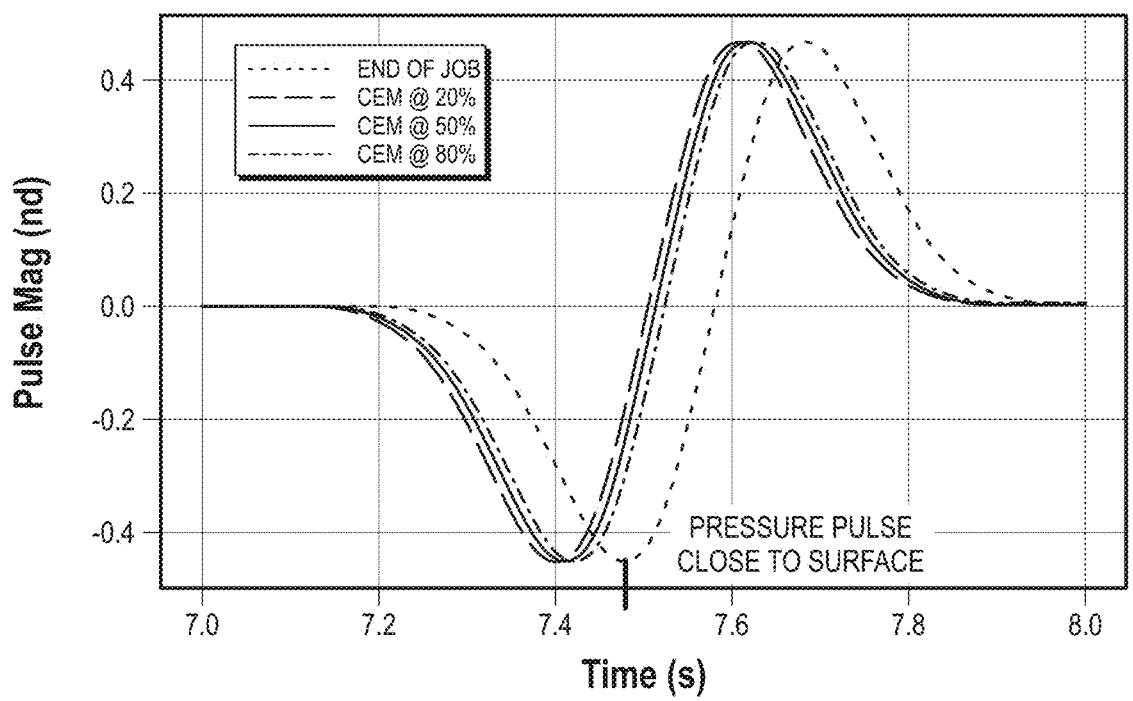
FIG. 13 illustrates a pressure pulse magnitude measured close to the surface of the wellbore as a function of time in accordance with some embodiments of the present disclosure.
Figure 14:
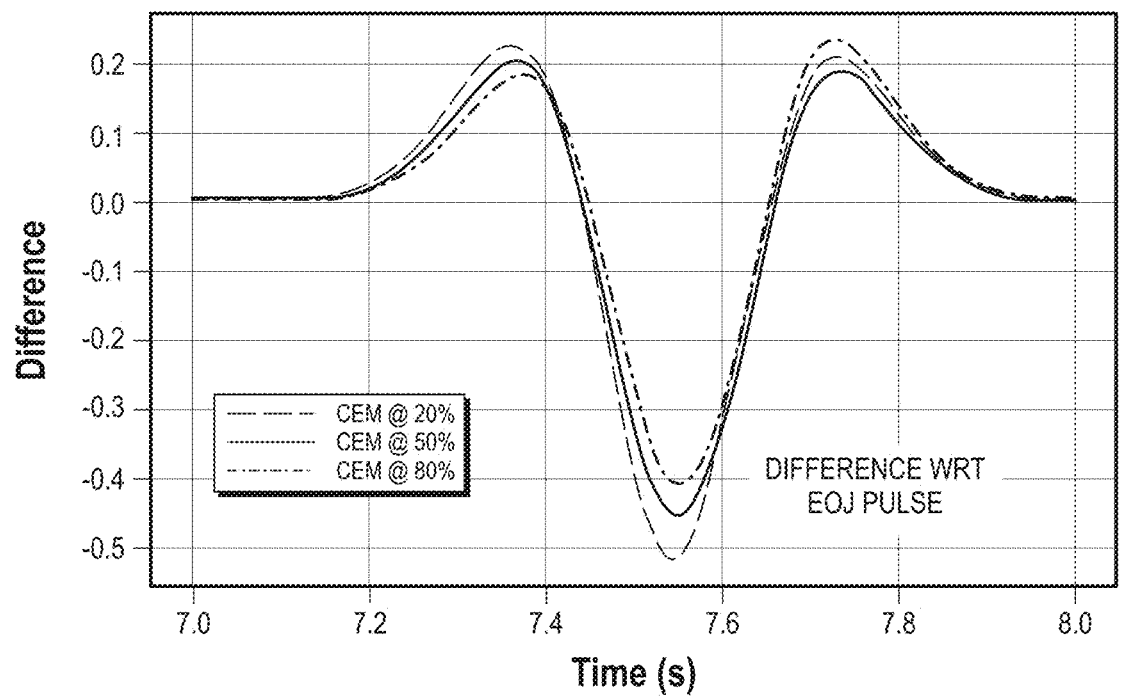
FIG. 14 illustrates magnitude difference in the pressure pulse with respect to the one measured at end of job as a function of time in accordance with some embodiments of the present disclosure.

FIG. 13 illustrates signal magnitude as a function of time in accordance with some embodiments of the present disclosure. The single pressure pulse has the form of FIG. 5. The signal magnitudes plotted on FIG. 13 are for the 4 different reflected signals measured on FIGS. 9-12, namely for the end of job, TOC at 20%, TOC at 50%, and TOC at 80%. The effect of heating from cement hydration is clearly seen on this Figure as the measured signal at the surface changes with different locations of the TOC, thus indicating the different temperature profiles in the wellbore will impact the acoustic signal as it travels in the casing. FIG. 14 illustrates the difference of the signal magnitudes shown on FIG. 13 for the 3 different TOC scenarios with the magnitude of the reflected signal at the end of job. This Figure further illustrates the impact of the heat released during cement hydration has on the acoustic signal as it travels in the casing.

Figures 15A, 15B:
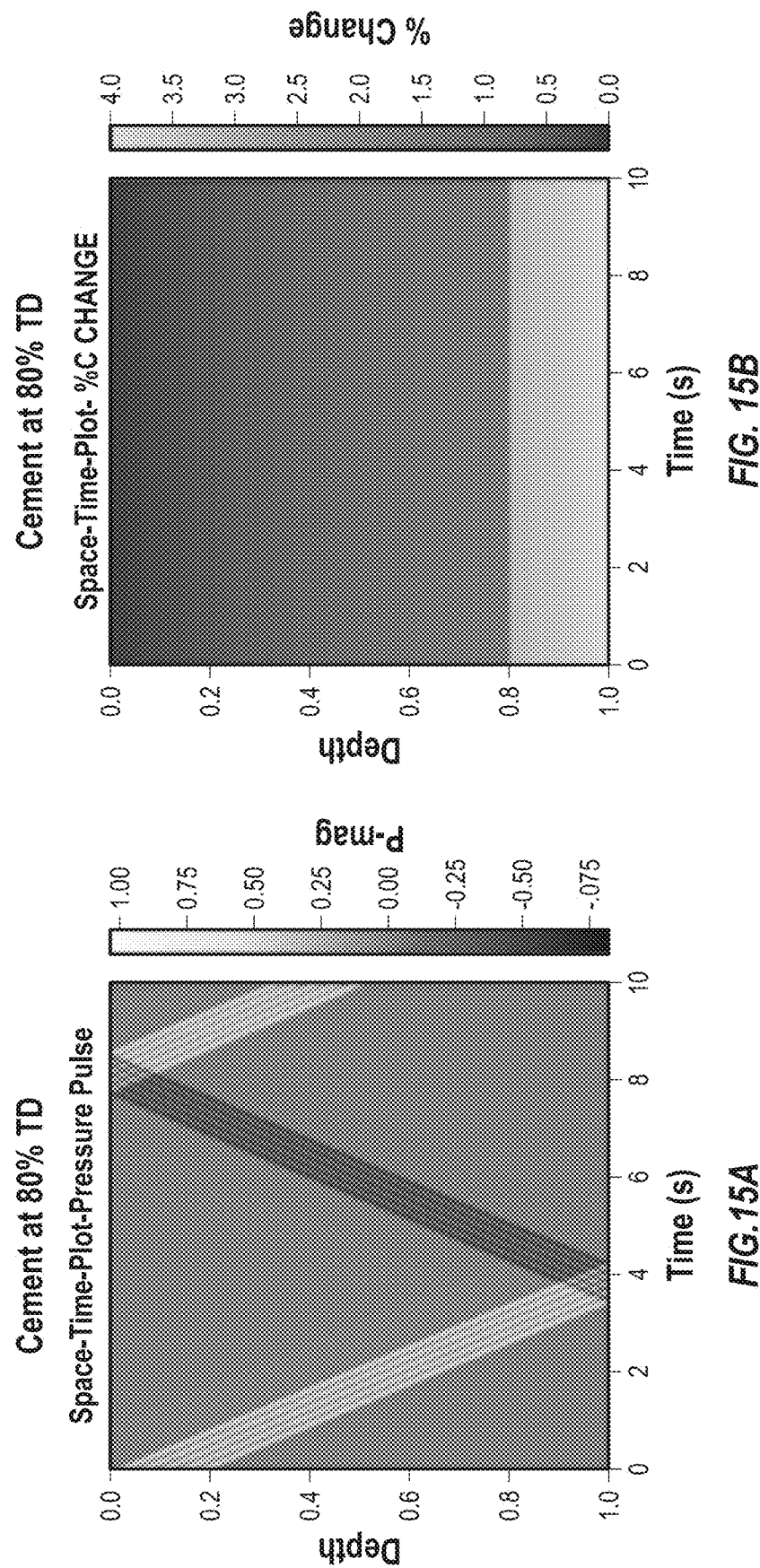
FIGS. 15a and 15b illustrate space-time plots of a multiple pulses during wait on cement with a top of a cement at a third depth in accordance with some embodiments of the present disclosure.

FIGS. 15a and 15b illustrate space-time plots of a simulated acoustic signal in the form of a signal Gaussian pulse in accordance with some embodiments. The single pressure pulse has the form of FIG. 5. The space-time plots on FIGS. 15a and 15b are based on simulated measurements of the reflected signal (e.g., reflected signal 134) taken during the wait-on-cement period. The pulse magnitudes were compared to initial measurements taken at the end of job with the differences co-related to temperature profiles from a temperature simulator (e.g., borehole temperature simulator 316 on FIG. 3). FIG. 15a shows the depth of the pressure pulse as a function of time as it travels in the casing and is reflected back to surface. The magnitude of the pressure pulse is also illustrated in FIG. 15a. FIG. 15b shows percent change in acoustic velocity as a function of depth and time. As illustrated, the acoustic velocity has an increased variance with depth, for example, due to increased borehole temperatures at depth. The impact from the heat released from cement hydration can also be seen in FIG. 15b. For example, there is a distinct acoustic velocity gradient caused by the underlying temperature gradient due the additional heat source that can be seen in FIG. 15b. From this acoustic velocity gradient, the TOC can be identified at approximately 80% depth in the borehole.

FIG. 16 illustrates a space-time plot of a simulated acoustic signal in the form of multiple Gaussian pulses at a first transmission time in accordance with some embodiments of the present disclosure. The multiple Gaussian pulses have the form of FIG. 6. FIG. 16 shows depth as a function of time. The magnitude of the pressure pulse is also shown on FIG. 16. On FIG. 16, the pressure pulses have a transmission time of 7.5 seconds. However, the pressure pulse has a transmission time that is longer than a time of flight of the pressure pulse in the wellbore.

FIG. 17 illustrates a space-time plot of a simulated acoustic signal in the form of multiple Gaussian pulses at a first transmission time in accordance with some embodiments of the present disclosure. The multiple Gaussian pulses have the form of FIG. 6. FIG. 17 shows depth as a function of time. The magnitude of the pressure pulse is also shown in FIG. 17. On FIG. 17, the pressure pulses have a transmission time of 10 seconds. However, the pressure pulse has a transmission time that is longer than a time of flight of the pressure pulse in the wellbore.

Figure 18:
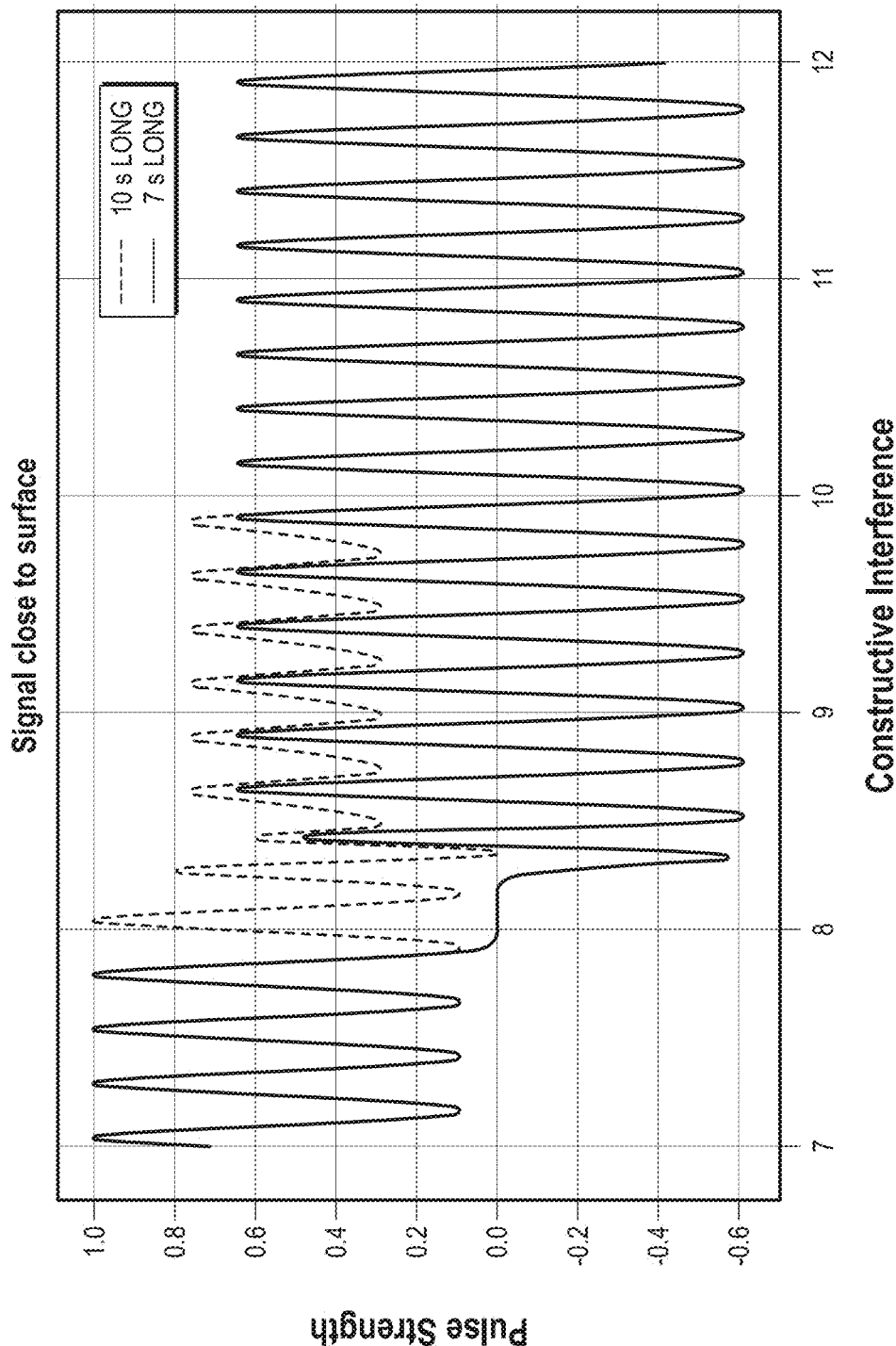
FIG. 18 illustrates a graph of pulse strength versus time for the pressure pulse patterns measured closed to the surface for the two transmission times of FIGS. 16 and 17 in accordance with some embodiments of the present disclosure.

FIG. 18 is a plot of pulse magnitude as a function of time for the energy signals from FIGS. 16 and 17. The multiple Gaussian pulses have the form of FIG. 6. FIG. 18 shows 2 curves. The solid line is the energy signal when the transmission time is 7.5 seconds, which is less than the time taken for the reflected wave to return to the surface. The dotted line is the energy signal when the transmission time is 10 seconds, representing a transmission time greater than the time for the reflected wave to reach the surface. For the solid line with a transmission time of 7.5 seconds, the curve at the time less than 8 seconds represents the transmitted wave while the curve at the time greater than 8.5 seconds represents interference between the transmitted and reflected waves. For the dashed line with a transmission time of 10 seconds, the region between 9-10 seconds on the x-axis, represents the interference pattern when there is an overlap between the transmitted and reflected wave.

Figures 19, 20:
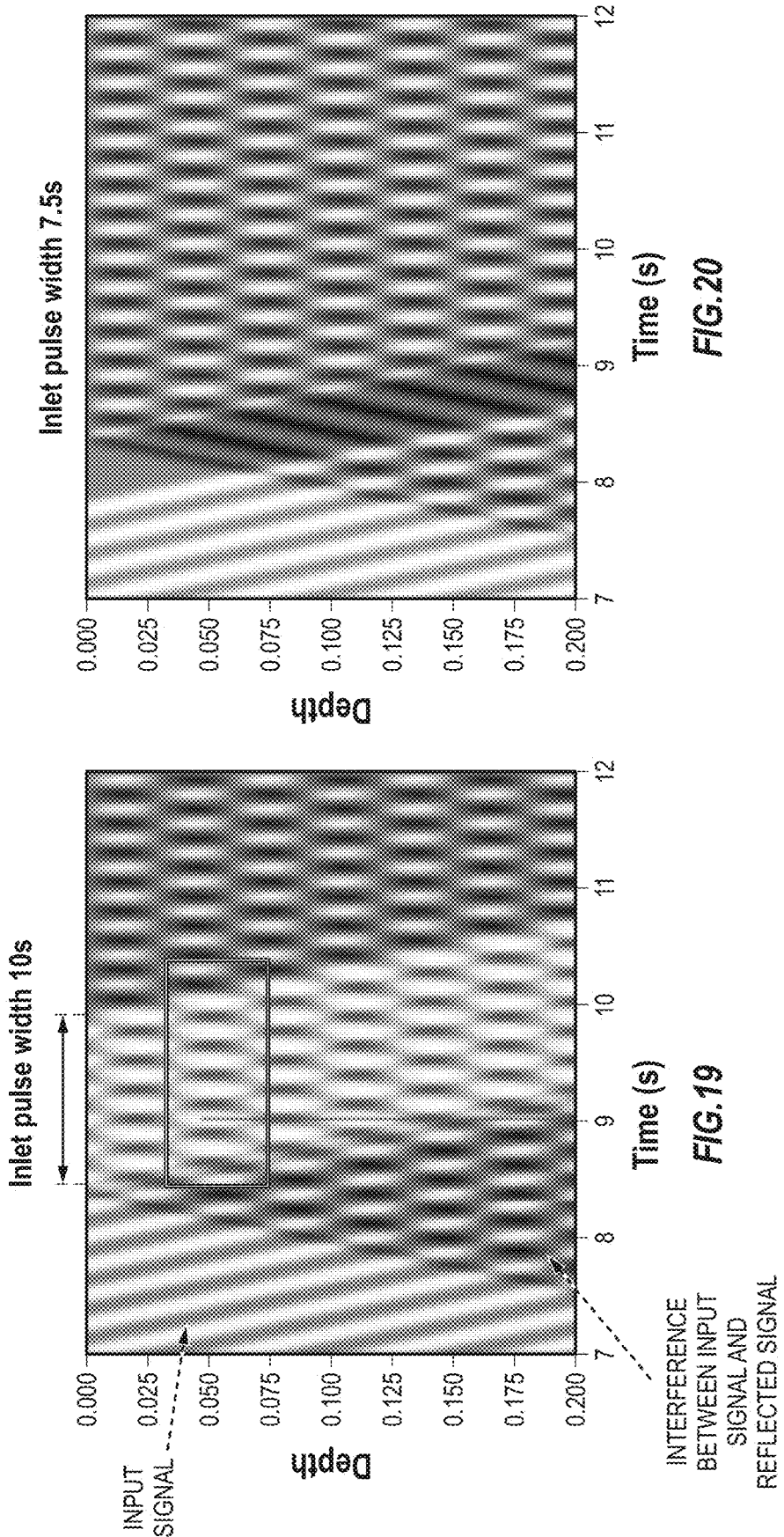
FIG. 19 illustrates a zoomed in view of the space-time plot in FIG. 17, to indicate the patterns in incident and reflected pulse interaction close to surface for a continuous pulse at a first transmission time in accordance with some embodiments of the present disclosure.
FIG. 20 illustrates a zoomed in view of the space-time plot in FIG. 16, to indicate the patterns in incident and reflected pulse interaction close to surface at a second transmission time in accordance with some embodiments of the present disclosure.

FIG. 19 illustrates a space-time plot for simulated acoustic signals in the form of continuous Gaussian pulses. The multiple Gaussian pulses have the form of FIG. 6. FIG. 19 shows depth as a function of time. FIG. 19 is a zoomed in view of the space-time plot of FIG. 17. In particular, FIG. 19 zooms in on a section of FIG. 17 where the height is 0-0.2 and the width is 7-12 seconds, wherein 0.2 represents a non-dimensional depth. The magnitude of the pressure pulse is also shown on FIG. 19. On FIG. 19, the pressure pulse has transmission time (pulse width) of 10 seconds. As can be seen, there is interference between the input signal into casing and the reflected signal as the time of flight is shorter than the pulse width. In signal processing, the known incident signal may need to be subtracted to recover the reflected signal for TOC determination, for example, to account for the interference.

FIG. 20 illustrates a space-time plot for simulated acoustic signals in the form of continuous Gaussian pulses. The multiple Gaussian pulses have the form of FIG. 6. FIG. 20 shows depth as a function of time. FIG. 20 is a zoomed in view of the space time plot of FIG. 16. In particular, FIG. 20 zooms in on a section of FIG. 16 where the height is 0-0.2 and the width is 7-12 seconds, wherein 0.2 represents a non-dimensional depth. The magnitude of the pressure pulse is also shown on FIG. 20. On FIG. 20, the pressure pulse has transmission time (pulse width) of 7.5 seconds. As can be seen, there is interference between the input signal into casing and the reflected signal as the time of flight is shorter than the pulse width.

FIGS. 21a and 21b illustrate space-time plots of a simulated acoustic signal including a multiple, space-apart Gaussian pulses in accordance with some embodiments. The Gaussian pulses have the form of FIG. 8. The space-time plots on FIGS. 21a and 21b are based on initial simulated measurements of a reflected signal (e.g., reflected signal 134) taken at the end of job, for example, where there is no longer circulation. FIG. 21a shows the depth of the pressure pulse as a function of time as it travels in the casing and is reflected back to surface. The magnitude of the pressure pulse is also illustrated in FIG. 21a. FIG. 21b shows percent change in acoustic velocity as a function of depth and time. As illustrated, the acoustic velocity has an increased variance with depth, for example, due to increased borehole temperatures at depth. This an initial measurement so temperatures from setting of the set cement has not yet had an effect on temperature.

Figure 22:
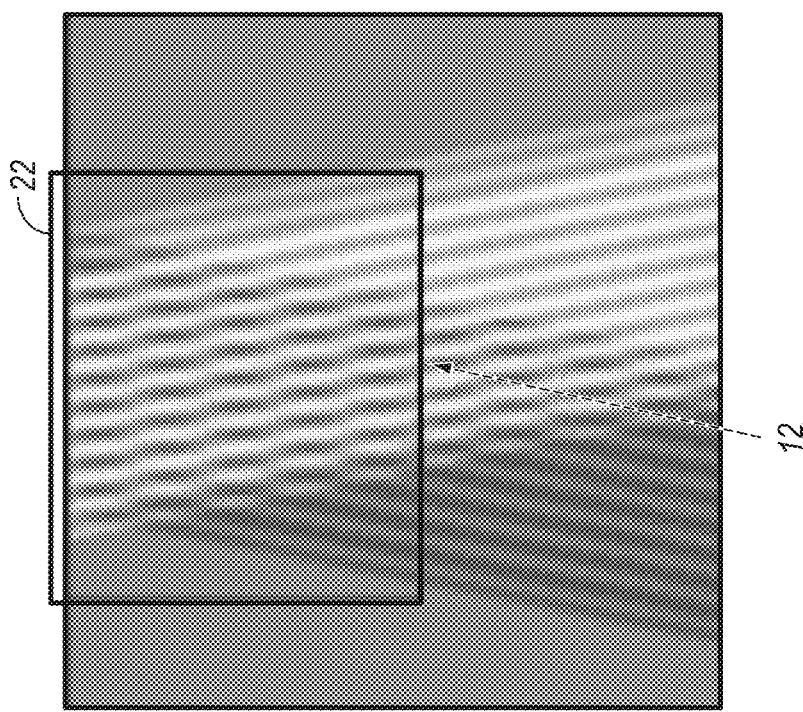
FIG. 22 is a close-up taken on box 22 of FIG. 21a in accordance with some embodiments of the present disclosure.

FIG. 22 is a close-up view of the space-time plot from FIG. 21a in accordance with example embodiments. Specifically, FIG. 22 shows the portion of FIG. 21a indicated by box 22. In this close-up view, the region of the acoustic signal with constructive interference is shown in more detail. In signal processing, the known incident signal may need to be subtracted to recover the reflected signal for TOC determination, for example, to account for the interference.

Figure 23:
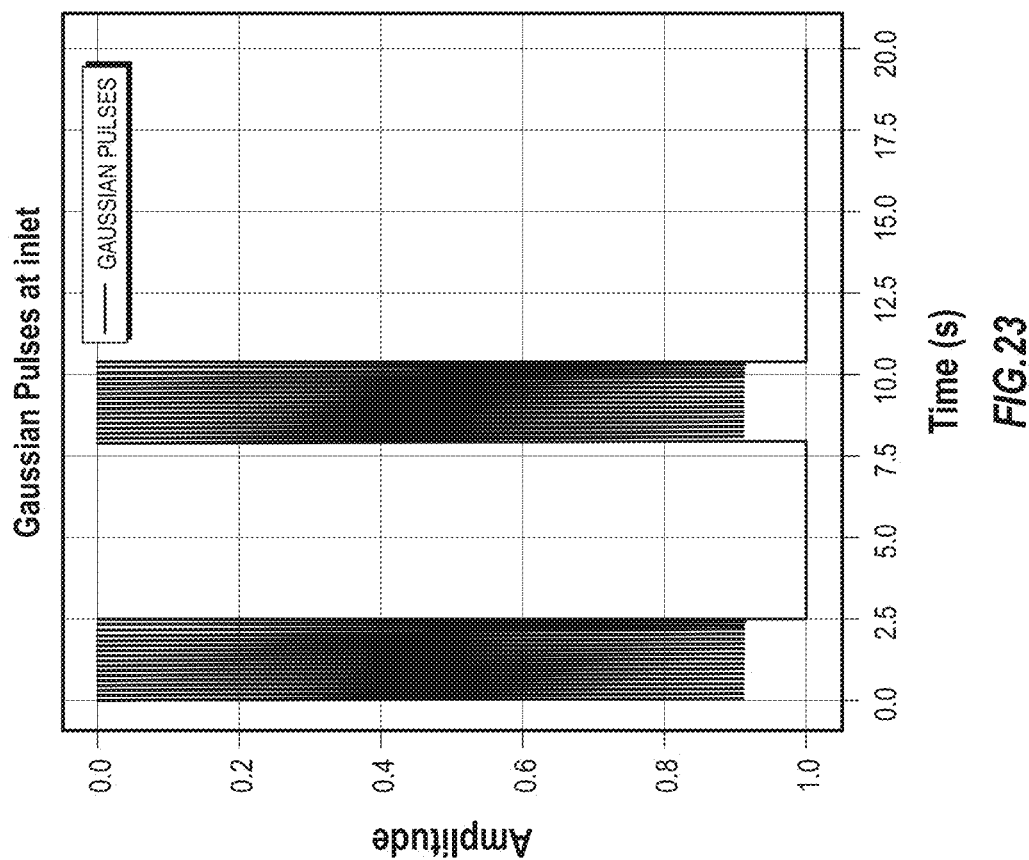
FIG. 23 is a plot of magnitude versus time for the multiple pulses of FIGS. 21a and 21b in accordance with some embodiments of the present disclosure.

FIG. 23 is a plot of magnitude versus time of the acoustic signal from FIGS. 21a and 21b including a multiple, space-apart Gaussian pulses in accordance with some embodiments. The plot on FIG. 23 is for the emitted acoustic signal. As illustrated, the Gaussian pulses are spaced apart by approximately 5 seconds.

Figures 24A, 24B:
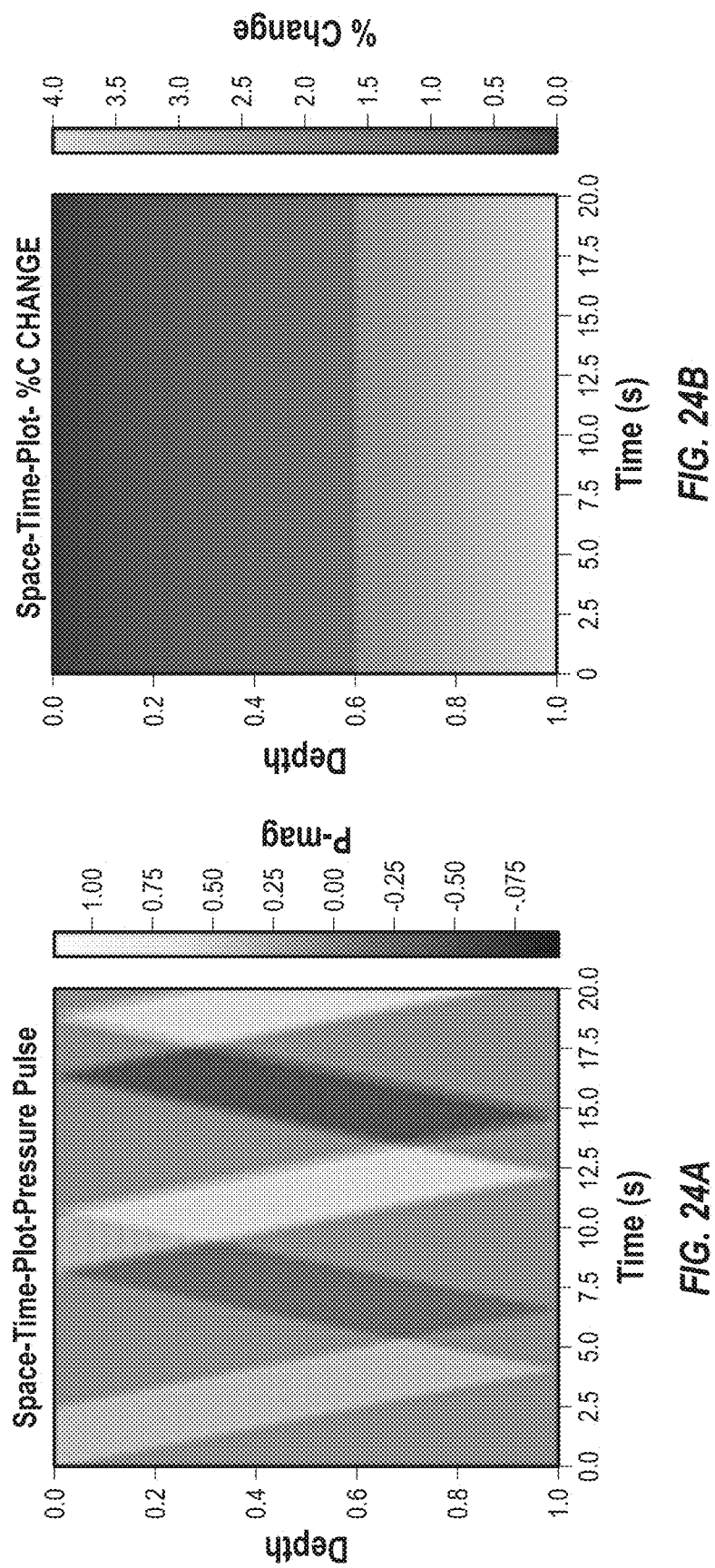
FIGS. 24a and 24b illustrate space-time plots of a single pressure pulse during wait on cement with a top of a cement at a first depth in accordance with some embodiments of the present disclosure.

FIGS. 24a and 24b illustrate space-time plots of the simulated acoustic signal from FIGS. 21a and 22b with measurements taken during the wait-on-cement period with a TOC at a first depth in accordance with some embodiments of the present disclosure. The Gaussian pulses have the form of FIG. 8. The space-time plots on FIGS. 24a and 24b are based on simulated measurements of the reflected signal (e.g., reflected signal 134) taken during the wait-on-cement period. The pulse magnitudes were compared to the initial measurements of FIGS. 21a and 22b with the differences co-related to temperature profiles from a temperature simulator (e.g., borehole temperature simulator 316 on FIG. 3FIG. 24a shows the depth of the pressure pulse as a function of time as it travels in the casing and is reflected back to surface. The magnitude of the pressure pulse is also illustrated in FIG. 24a. FIG. 24b shows percent change in acoustic velocity as a function of depth and time. As illustrated, the acoustic velocity has an increased variance with depth, for example, due to increased borehole temperatures at depth. The impact from the heat released from cement hydration can also be seen on FIG. 24b. For example, there is a distinct acoustic velocity gradient caused by the underlying temperature gradient due to the additional heat source that can be seen in FIG. 24. From this acoustic velocity gradient, the TOC can be identified at approximately 60% depth in the borehole.

Accordingly, the present disclosure may provide for the determination of the top of cement, for example, using one or more measurements of reflected energy signals and borehole temperature data, such as simulated temperature profiles over time. The methods and systems may include any of the various features disclosed herein, including one or more of the following statements.

Statement 1. A method for detecting top of cement, including: emitting input energy signals into a cement displacement fluid positioned in a casing, wherein the input energy signals travel in the cement displacement fluid down the casing and are reflected in the casing to form reflected energy signals that return to a surface, and wherein the input energy signals are emitted while a cement composition is setting to harden and form compressive strength in a borehole annulus; measuring one or more properties of the reflected energy signals; and determining the top of cement of the cement composition in the borehole annulus based on at least the one or more properties and temperature data of the borehole.

Statement 2. The method of Statement 1, wherein both the input energy signals are emitted and the one or more properties are detected periodically during a wait-on-cement period.

Statement 3. The method of Statement 1 or Statement 2, wherein the input energy signals include at least one of acoustic signals, electromagnetic signals, or light signals.

Statement 4. The method of any preceding statement, wherein the input energy signals include acoustic signals with a sine wave.

Statement 5. The method of any preceding statement, the input energy signals include pressure waves introduced into the cement displacement fluid with a pressure wave generator that reflect from a top plug in the casing.

Statement 6. The method of any preceding statement, wherein the setting of the cement composition heats the cement displacement fluid to modify the input energy signals and reflected energy signals traveling in the cement displacement fluid.

Statement 7. The method of any preceding statement, wherein the one or more properties include a magnitude of the reflected energy signals.

Statement 8. The method of any preceding statement, wherein the one or more properties include a time of flight.

Statement 9. The method of any preceding statement, wherein the temperature data includes a plurality of simulated temperature profiles for different simulated top of cement locations.

Statement 10. The method of any preceding statement, wherein the determining the top of cement includes comparing pulse magnitudes of the reflected energy signals with an initial measurement of pulse magnitudes.

Statement 11. The method of any preceding statement, wherein the input energy signals are reflected off a top plug positioned in the casing.

Statement 12. The method of any preceding statement, wherein the determining the top of cement includes comparing a measured time of flight for the input energy signals and the reflected energy signals with a calculated time of flight.

Statement 13. A method for detecting top of cement, including: emitting input acoustic signals into a cement displacement fluid, wherein the cement displacement fluid is positioned in a casing that extends through a cement composition, wherein the input acoustic signals are input periodically while the cement composition is setting to harden and form compressive strength in a borehole annulus; allowing the input acoustic signals to travel axially down the casing in the cement displacement fluid; measuring one or more properties of reflected energy signals of the input acoustic signals that traveled back through the cement displacement fluid, wherein the reflected energy signals change over time due at least in part to changes in temperatures in the borehole; and determining the top of cement of the cement composition in the borehole annulus based on at least the one or more properties and temperature data of the borehole.

Statement 14. The method of Statement 13, wherein the input acoustic signals have a sine wave.

Statement 15. The method of Statement 13 or Statement 14, wherein the one or more properties include a magnitude of the reflected energy signals.

Statement 16. The method of any one of Statements 13 to 15 wherein the one or more properties include a time of flight.

Statement 17. The method of any one of Statements 13 to 16, wherein the temperature data includes a plurality of simulated temperature profiles for different simulated top of cement locations.

Statement 18. A system for detecting top of cement, including: a signal generator positioned to emit input energy signals into a casing disposed in a borehole; a receiver positioned to measure one or more properties of reflected energy signals from the casing; and an information handling system configured to determine the top of cement based on at least the one or more properties and temperature data of the borehole.

Statement 19. The system of Statement 18, wherein the signal generator includes a pressure wave generator.

Statement 20. The system of Statement 18 or Statement 19, wherein the temperature data includes a plurality of simulated temperature profiles for different simulated top of cement locations.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A method for detecting a top of cement in a borehole, comprising:
emitting, from a surface, input energy signals into a cement displacement fluid positioned in a casing, wherein the input energy signals:

travel down the casing in the cement displacement fluid, reflect in the casing to form reflected energy signals that return to the surface, and are emitted while a cement composition is setting to harden and form compressive strength in a borehole annulus;

measuring one or more properties of the reflected energy signals; and determining the top of cement of the cement composition in the borehole annulus based on at least the one or more properties and temperature data of the borehole.

2. The method of claim 1, wherein both the input energy signals are emitted and the one or more properties are detected periodically during a wait-on-cement period.

3. The method of claim 1, wherein the input energy signals comprise at least one of acoustic signals or electromagnetic signals.

4. The method of claim 1, wherein the input energy signals comprise acoustic signals with a sine wave.

5. The method of claim 1, wherein the input energy signals comprise pressure waves, wherein the pressure waves are generated by a pressure wave generator, and wherein the pressure waves reflect from a top plug in the casing.

6. The method of claim 1, wherein an amount of heat generated by the setting of the cement composition modifies the reflected energy signals traveling in the cement displacement fluid, and wherein a property, of the one or more properties, correlates to the amount of heat.

7. The method of claim 1, wherein the one or more properties comprise a magnitude of the reflected energy signals.

8. The method of claim 1, wherein the one or more properties comprise a time of flight.

9. The method of claim 1, wherein the temperature data comprises a plurality of simulated temperature profiles for different simulated top of cement locations.

10. The method of claim 1, wherein the determining the top of cement comprises:

comparing an initial measurement of first pulse magnitudes with a subsequent measurement of second pulse magnitudes of the reflected energy signals.

11. The method of claim 1, wherein the input energy signals are reflected off a top plug positioned in the casing.

12. The method of claim 1, wherein the determining the top of cement comprises comparing a measured time of flight for the input energy signals and the reflected energy signals with a calculated time of flight.

13. A method for detecting a top of cement in a borehole, including:

emitting input acoustic signals into a cement displacement fluid, wherein the cement displacement fluid is positioned in a casing that extends through a cement composition, wherein the input acoustic signals are input periodically while the cement composition is setting to harden and form compressive strength in a borehole annulus;

allowing the input acoustic signals to travel axially down the casing in the cement displacement fluid;

measuring one or more properties of reflected energy signals of the input acoustic signals that traveled back through the cement displacement fluid, wherein the reflected energy signals change over time due at least in part to changes in temperatures in the borehole; and determining the top of cement of the cement composition in the borehole annulus based on at least the one or more properties and temperature data of the borehole.

14. The method of claim 13, wherein the input acoustic signals have a sine wave.

15. The method of claim 13, wherein the one or more properties comprise a magnitude of the reflected energy signals.

16. The method of claim 13, wherein the one or more properties comprise a time of flight.

17. The method of claim 13, wherein the temperature data comprises a plurality of simulated temperature profiles for different simulated top of cement locations.

18. A system for detecting a top of cement, including:

a signal generator positioned to emit input energy signals into a casing disposed in a borehole;

a receiver positioned to measure one or more properties of reflected energy signals from the casing; and an information handling system configured to determine the top of cement based on at least the one or more properties and temperature data of the borehole.

19. The system of claim 18, wherein the signal generator comprises a pressure wave generator.

20. The system of claim 18, wherein the temperature data comprises a plurality of simulated temperature profiles for different simulated top of cement locations.

* * * * *